(12) United States Patent
Kanegae et al.

(10) Patent No.: US 7,586,625 B2
(45) Date of Patent: Sep. 8, 2009

(54) POSITION VERIFYING APPARATUS AND METHOD, POSITION MEASURING APPARATUS AND METHOD, AND COMPUTER PROGRAM FOR POSITION VERIFICATION OR POSITION MEASUREMENT

(75) Inventors: Tohru Kanegae, Saitama (JP); Masatsugu Ogawa, Tokyo (JP); Masahiro Kato, Saitama (JP); Eisaku Kawano, Saitama (JP); Masahiro Miura, Saitama (JP)

(73) Assignees: Pioneer Corporation, Tokyo (JP); NEC Corporation, Tokyo (JP)

( * ) Notice: Subject to any disclaimer, the term of this patent is extended or adjusted under 35 U.S.C. 154(b) by 110 days.

(21) Appl. No.: 11/795,130

(22) PCT Filed: Jan. 13, 2006

(86) PCT No.: PCT/JP2006/300367
§ 371 (c)(1),
(2), (4) Date: Jul. 12, 2007

(87) PCT Pub. No.: WO2006/075697
PCT Pub. Date: Jul. 20, 2006

(65) Prior Publication Data
US 2008/0137503 A1 Jun. 12, 2008

(30) Foreign Application Priority Data
Jan. 14, 2005 (JP) .............................. 2005-008470

(51) Int. Cl.
*G01B 11/14* (2006.01)

(52) U.S. Cl. ....................................... 356/614; 356/620
(58) Field of Classification Search ................. 356/614, 356/615, 620
See application file for complete search history.

(56) References Cited

U.S. PATENT DOCUMENTS

| 6,459,492 B1 * | 10/2002 | Hercher ....................... 356/622 |
| 2002/0145961 A1 | 10/2002 | Tsai et al. |

FOREIGN PATENT DOCUMENTS

| EP | 1 187 112 A2 | 3/2002 |
| EP | 1 517 313 A1 | 3/2005 |
| JP | 2000-311346 | 11/2000 |
| JP | 2001-23237 | 1/2001 |
| JP | 2003-208737 | 7/2003 |
| WO | WO 2004/049321 A1 | 6/2004 |
| WO | WO 2004/114289 A1 | 12/2004 |

* cited by examiner

*Primary Examiner*—Roy Punnoose
(74) *Attorney, Agent, or Firm*—Young & Thompson

(57) ABSTRACT

A position verifying apparatus is provided with: a first recording device for recording the information into a first area of the first recording layer; a second recording device for recording a part of the information by laser light which has penetrated the first area and for recording another part of the information by laser light which does not penetrate the first area, into a second area of the second recording layer including at least a partial area which faces the first area; a reproducing device for reproducing the information; and a judging device for judging whether or not the relative shift is within tolerance, on the basis of a transit position at which reproduction quality transits from the reproduction quality indicated by the part of the information reproduced to the reproduction quality indicated by the another part of the information reproduced.

16 Claims, 20 Drawing Sheets

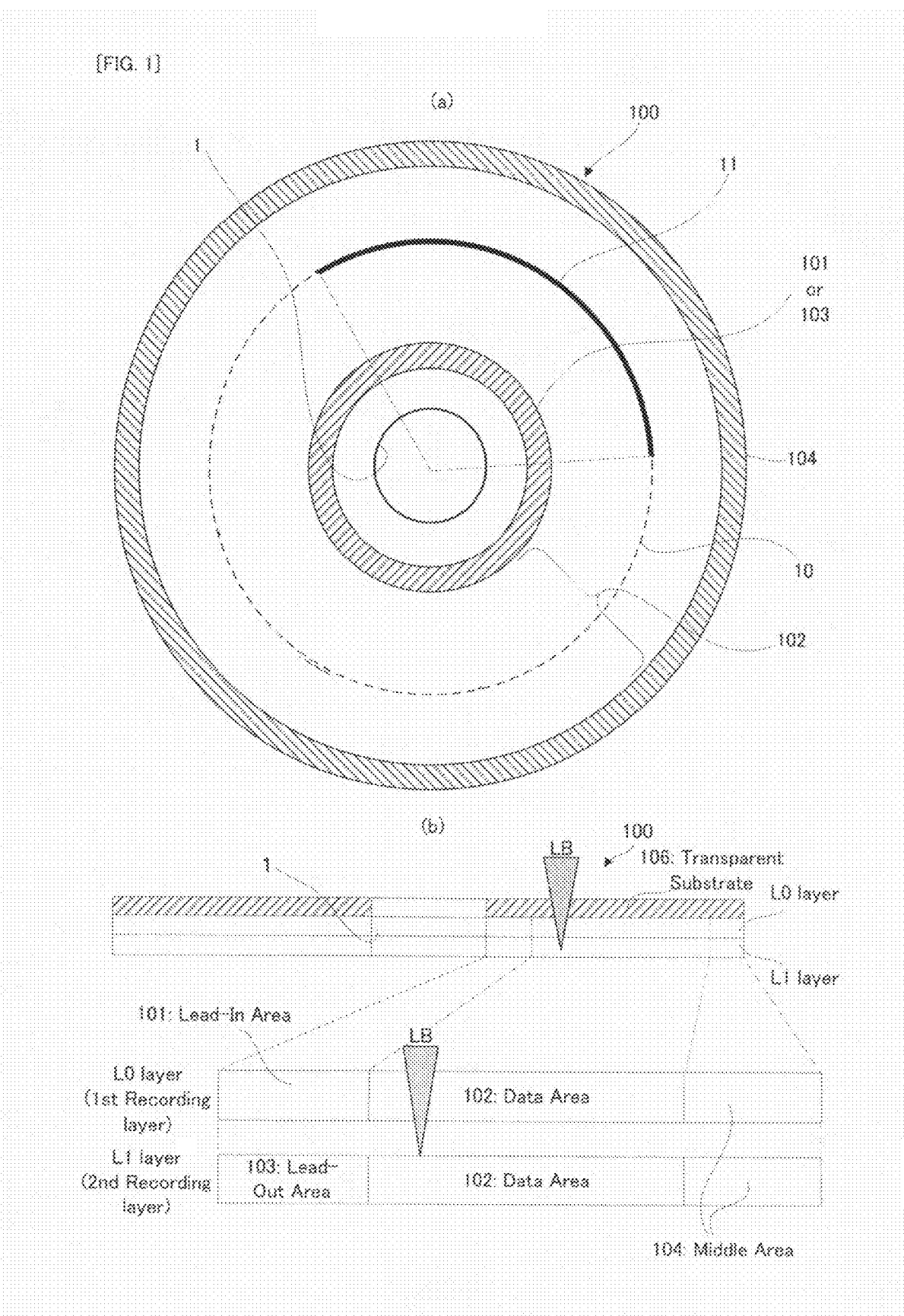

[FIG. 2]
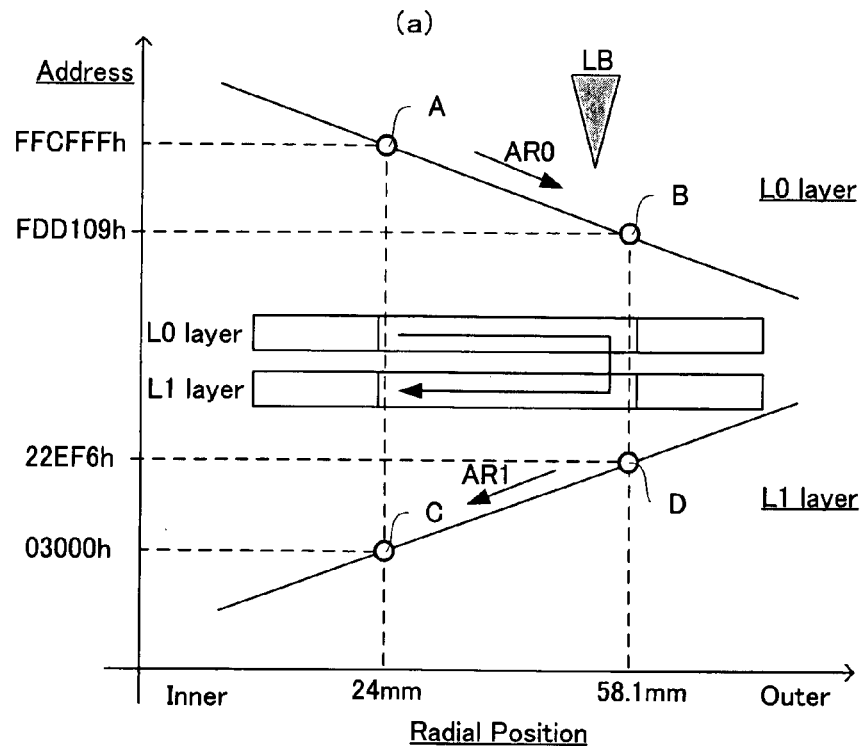
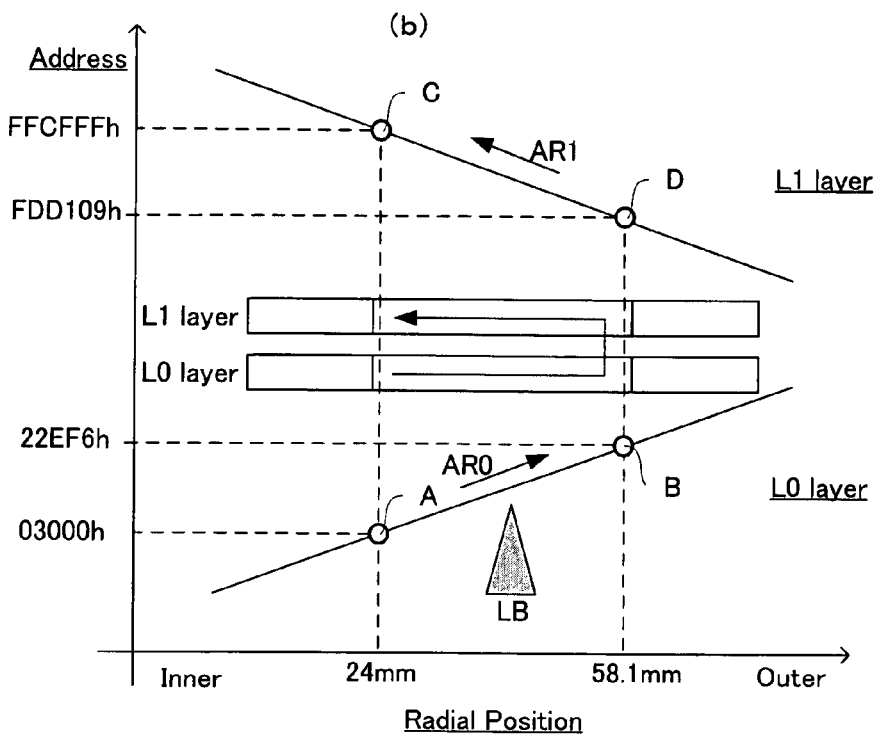

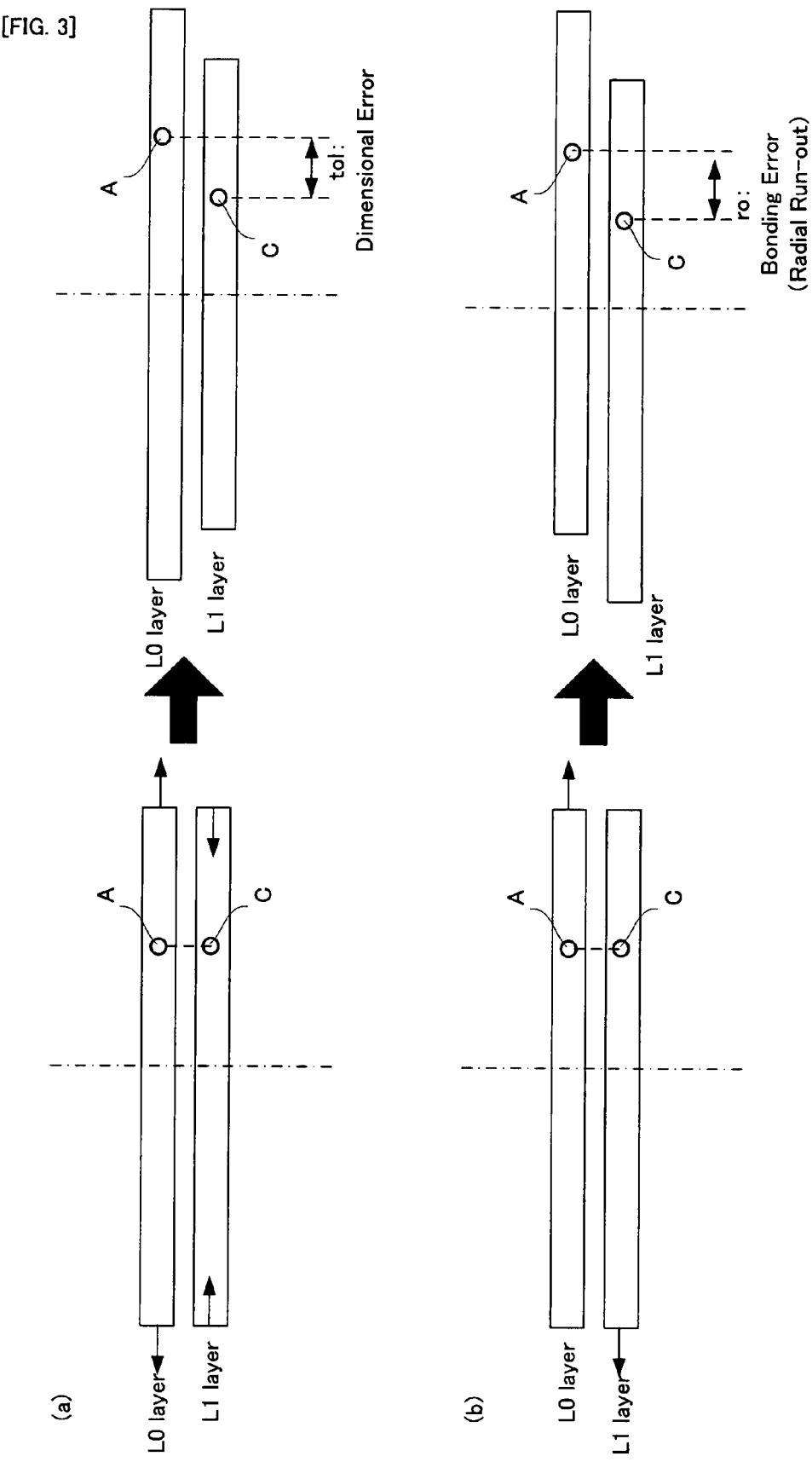
[FIG. 3]

[FIG. 4]
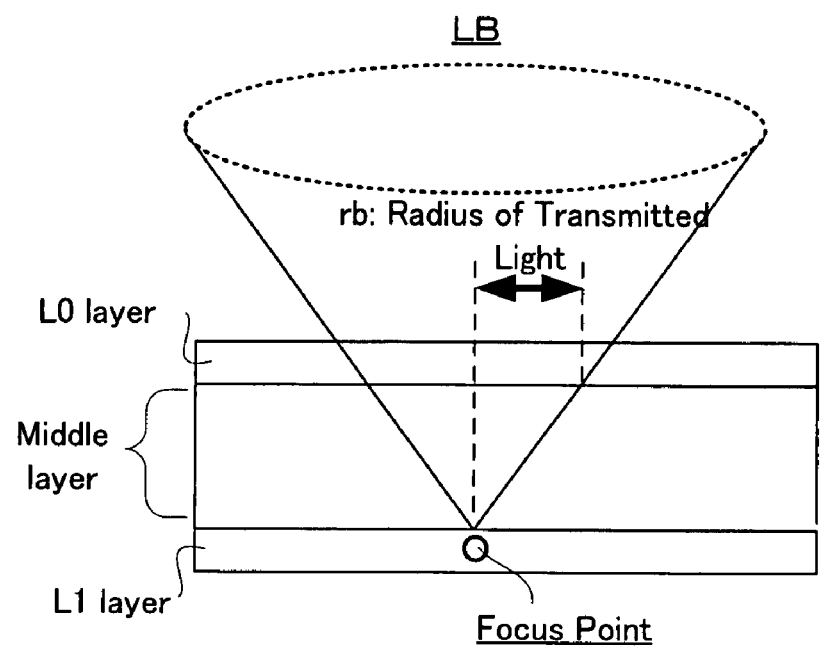
$rb = L \times \tan(\sin^{-1}(NA/n))$

[FIG. 5]
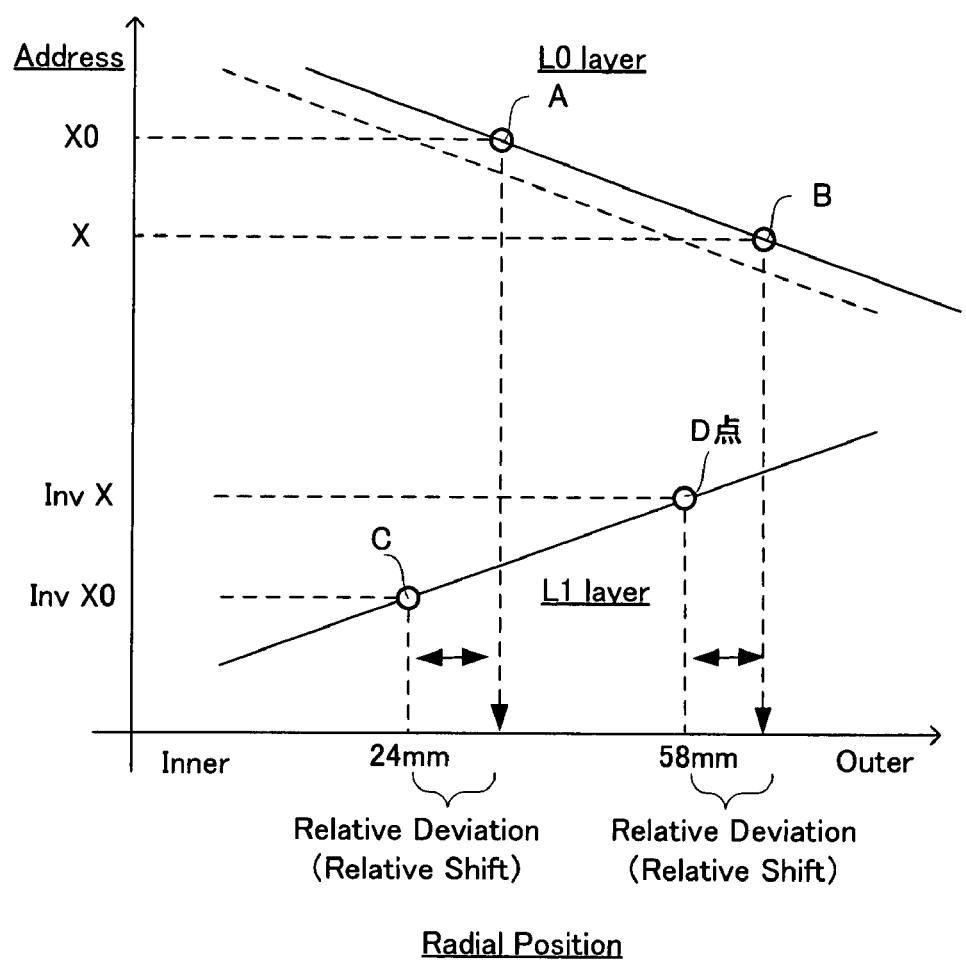

[FIG. 6]
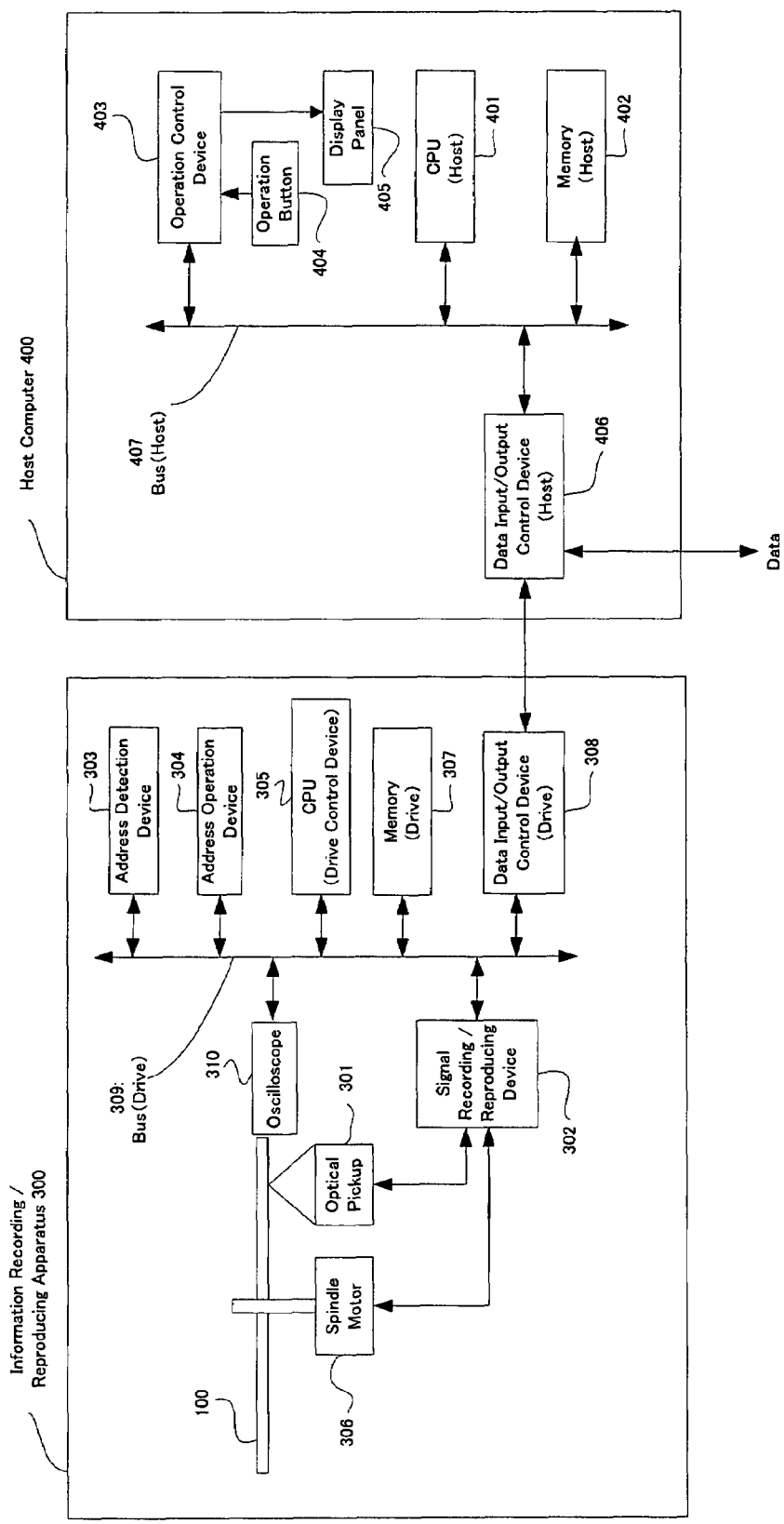

[FIG. 7]
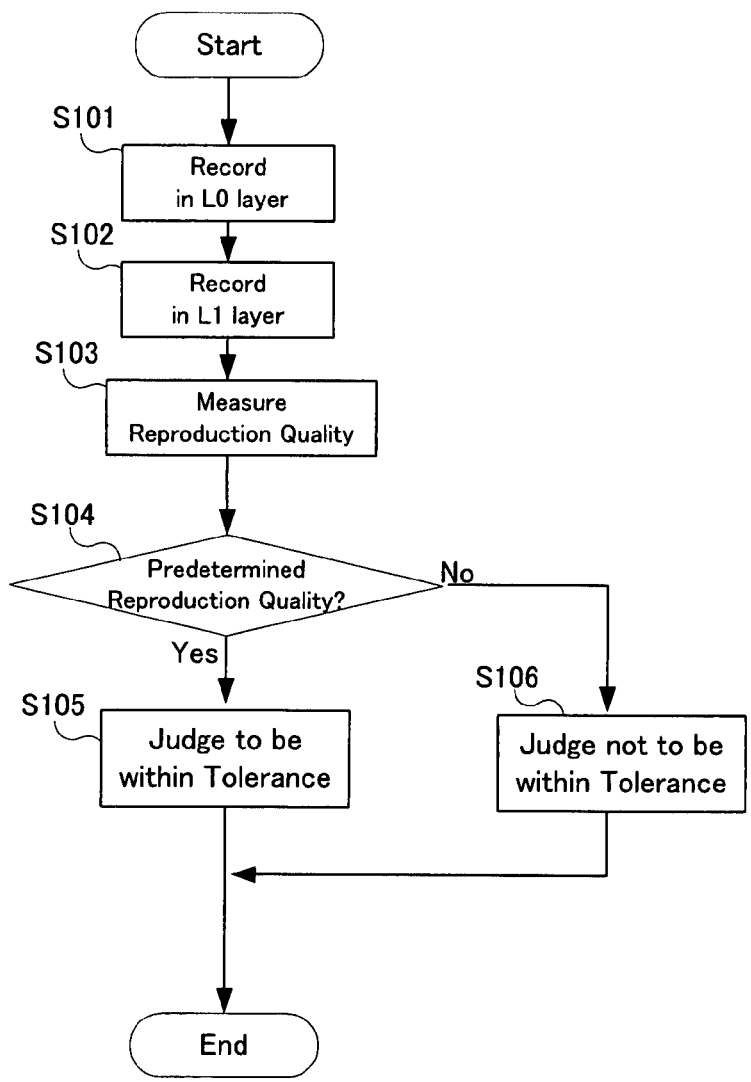

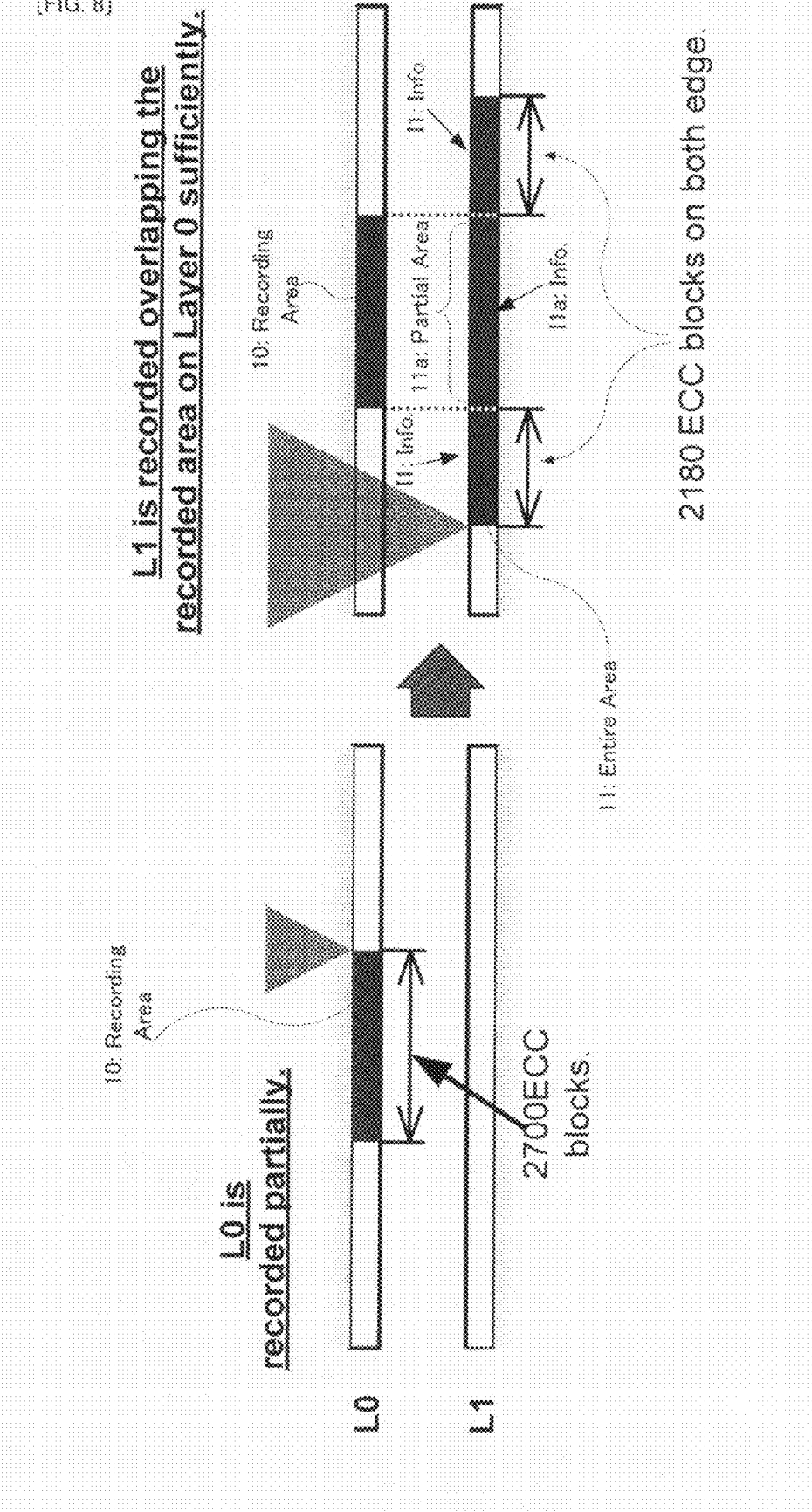

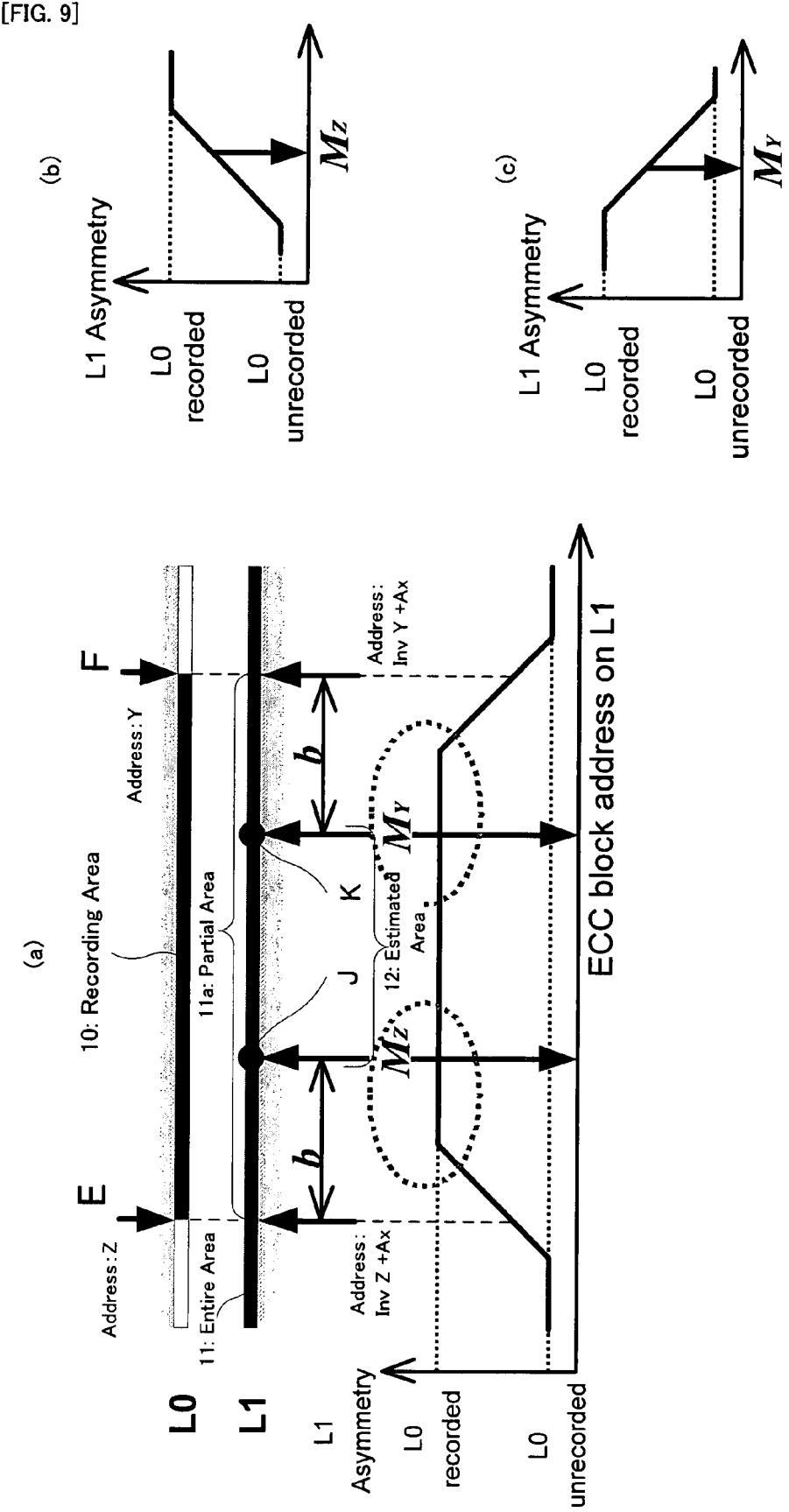

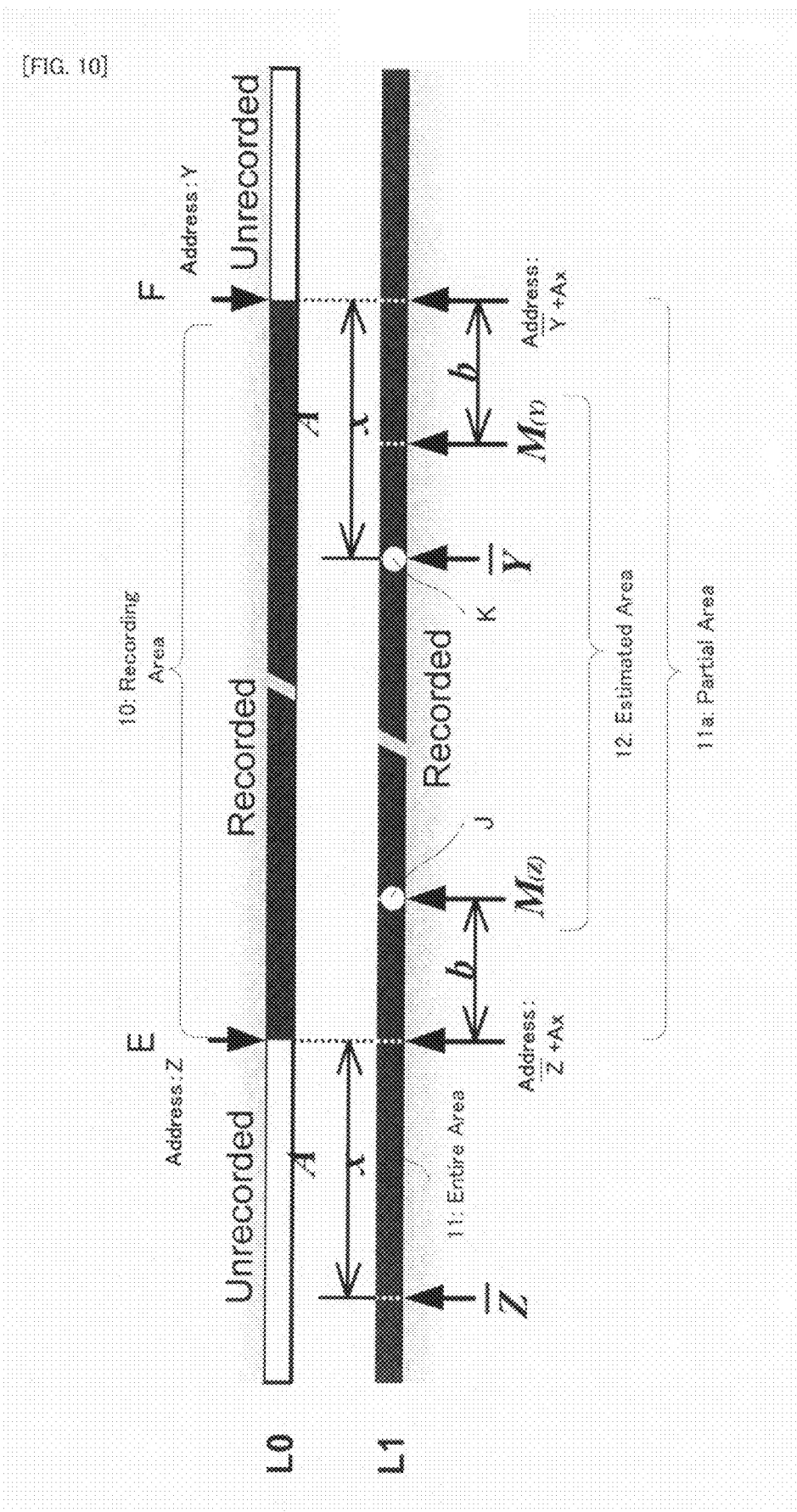

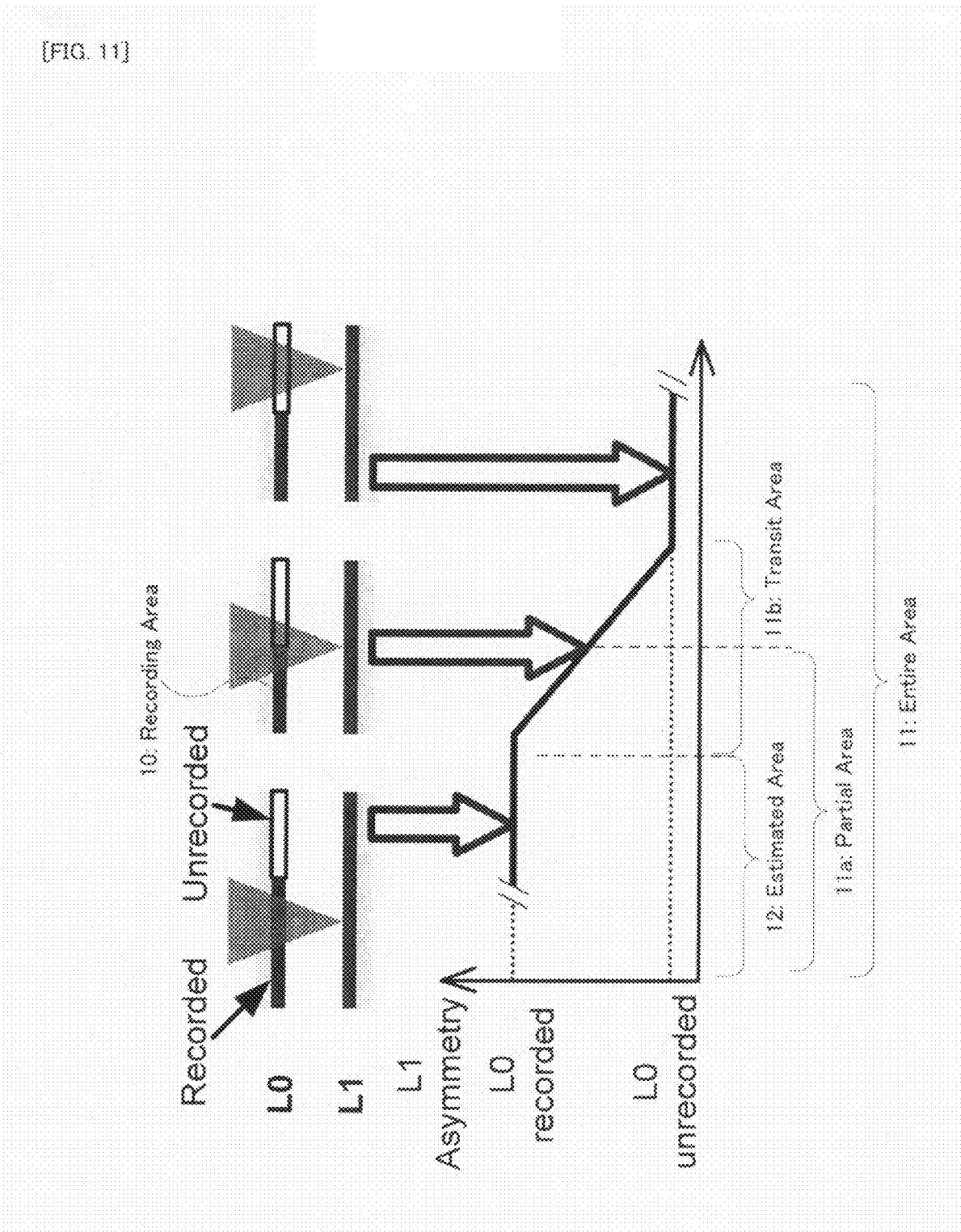
[FIG. 11]

[FIG. 12]
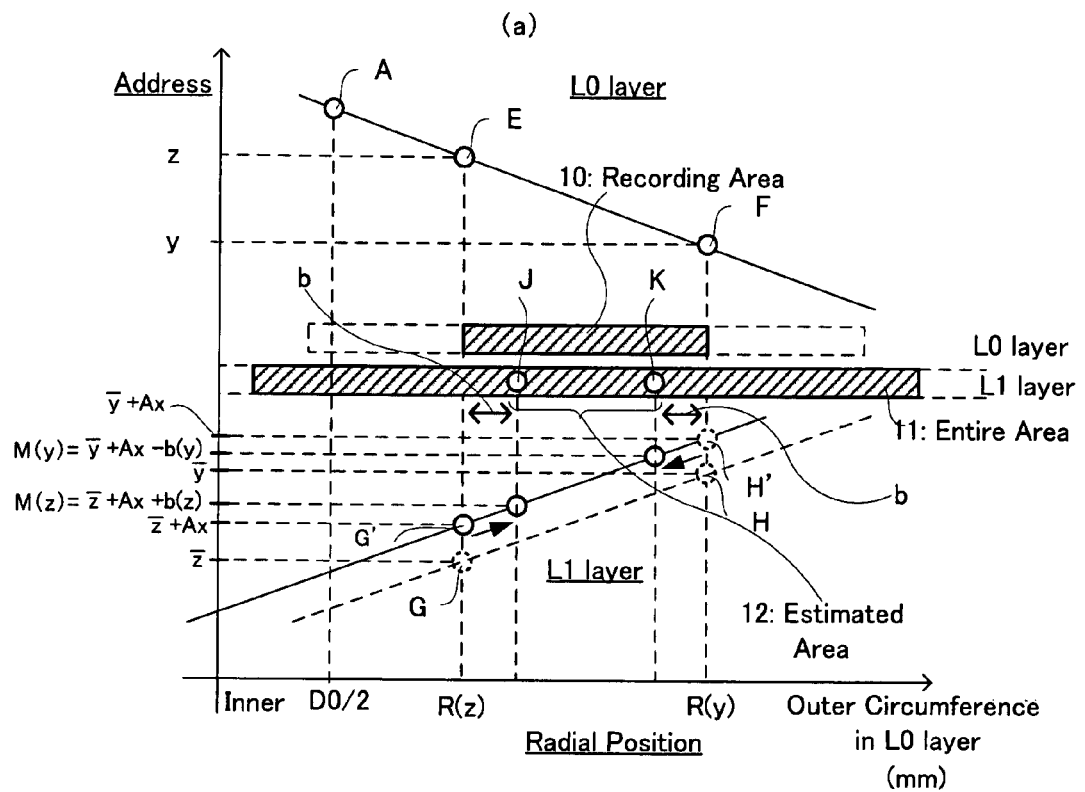
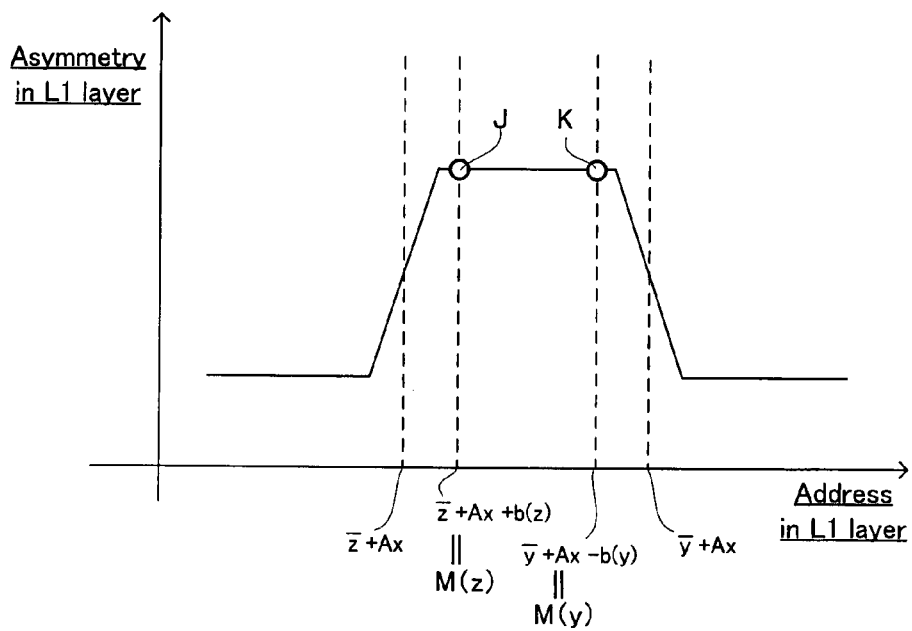

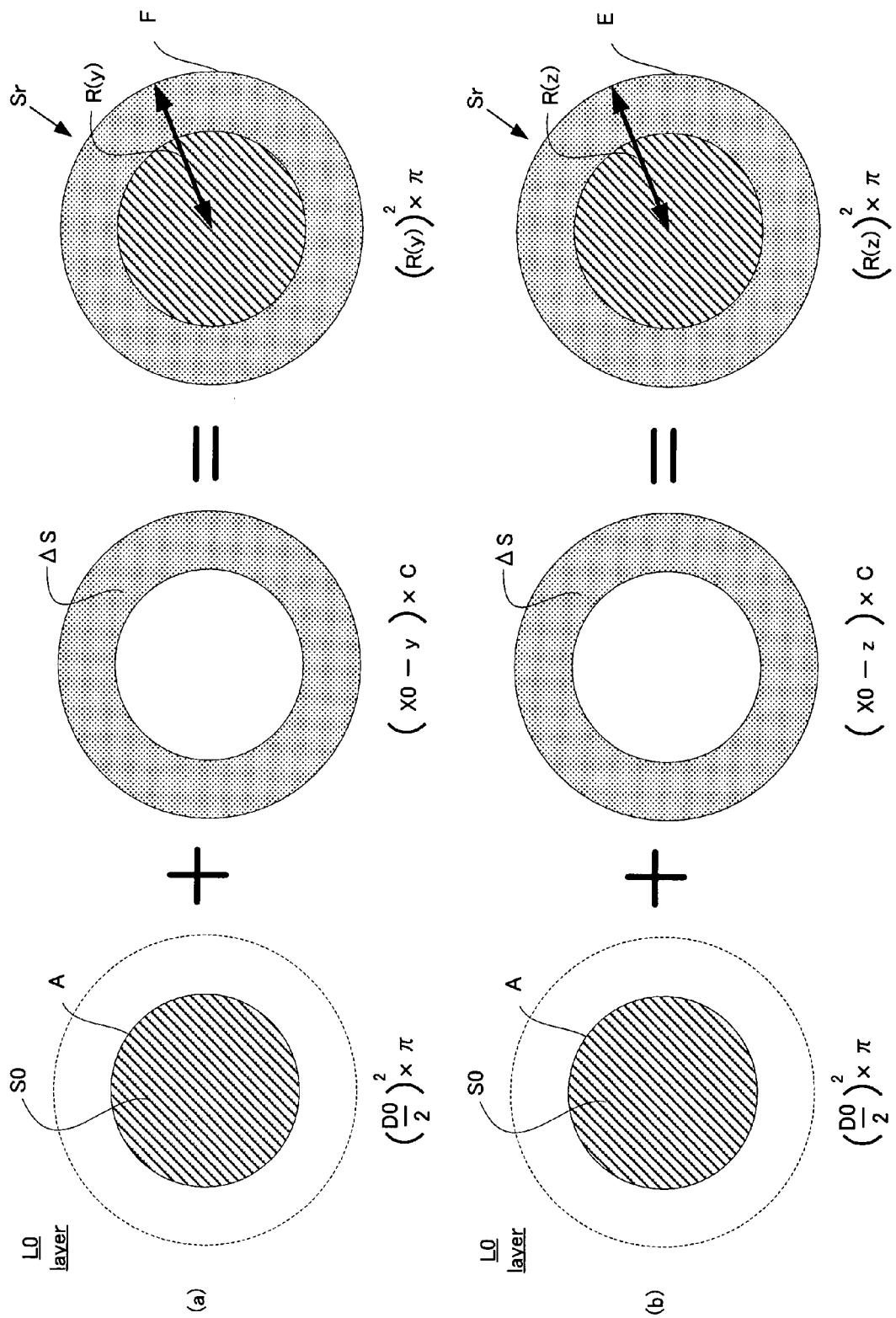

[FIG. 14]
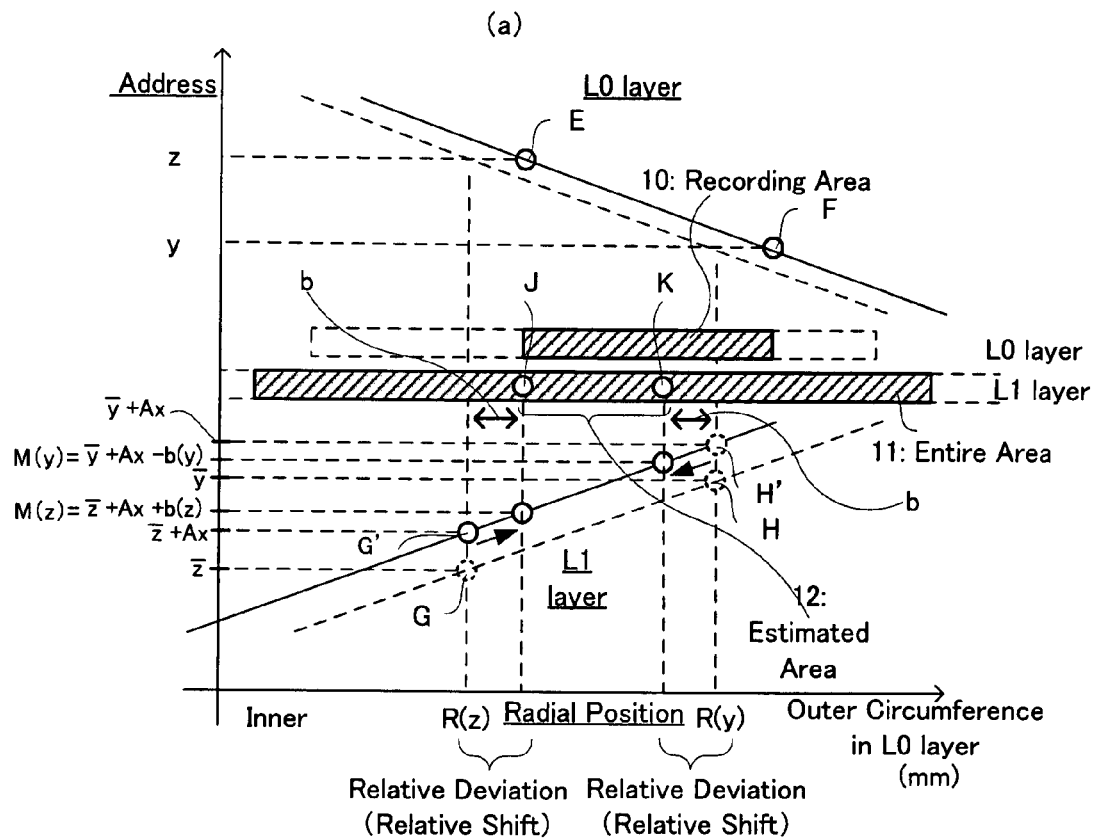
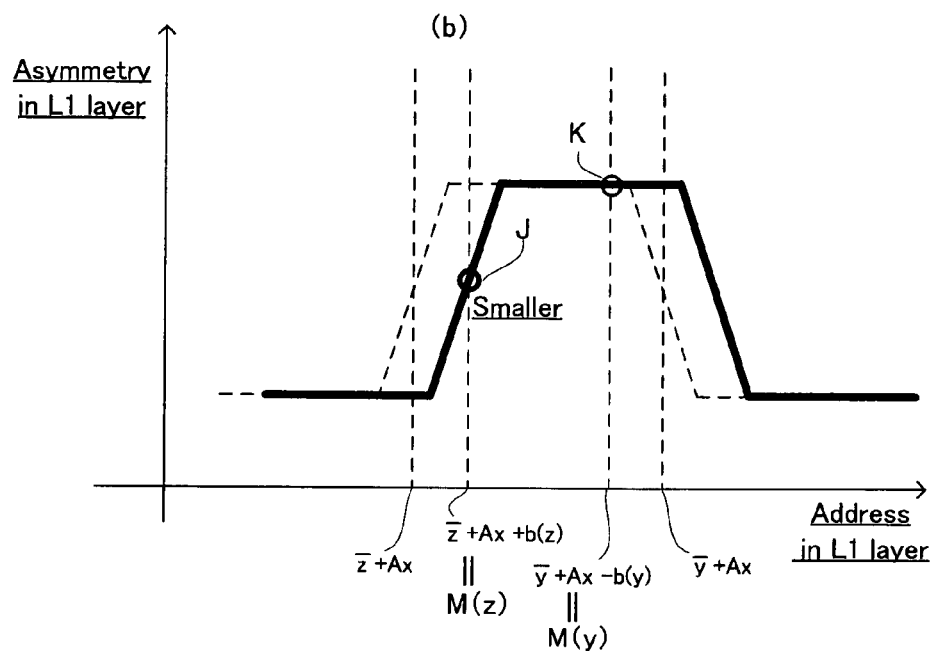

[FIG. 15]
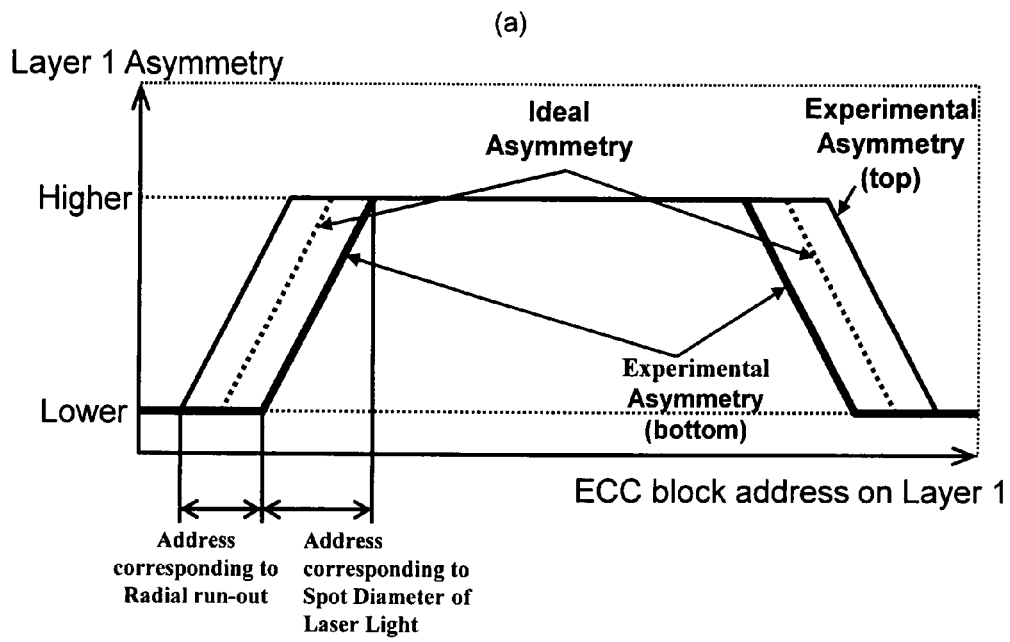
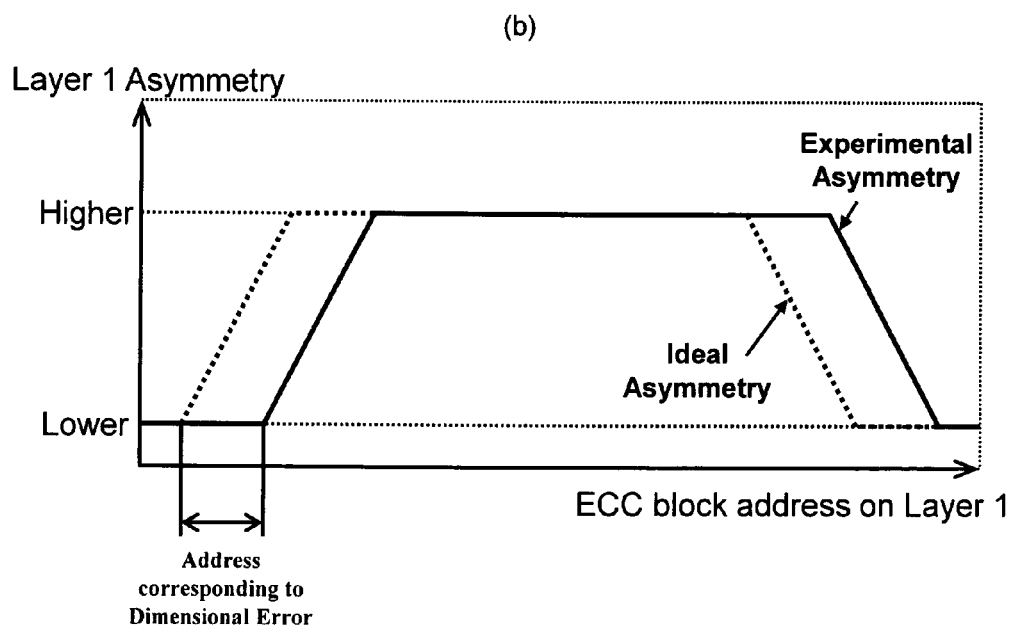

[FIG. 16]
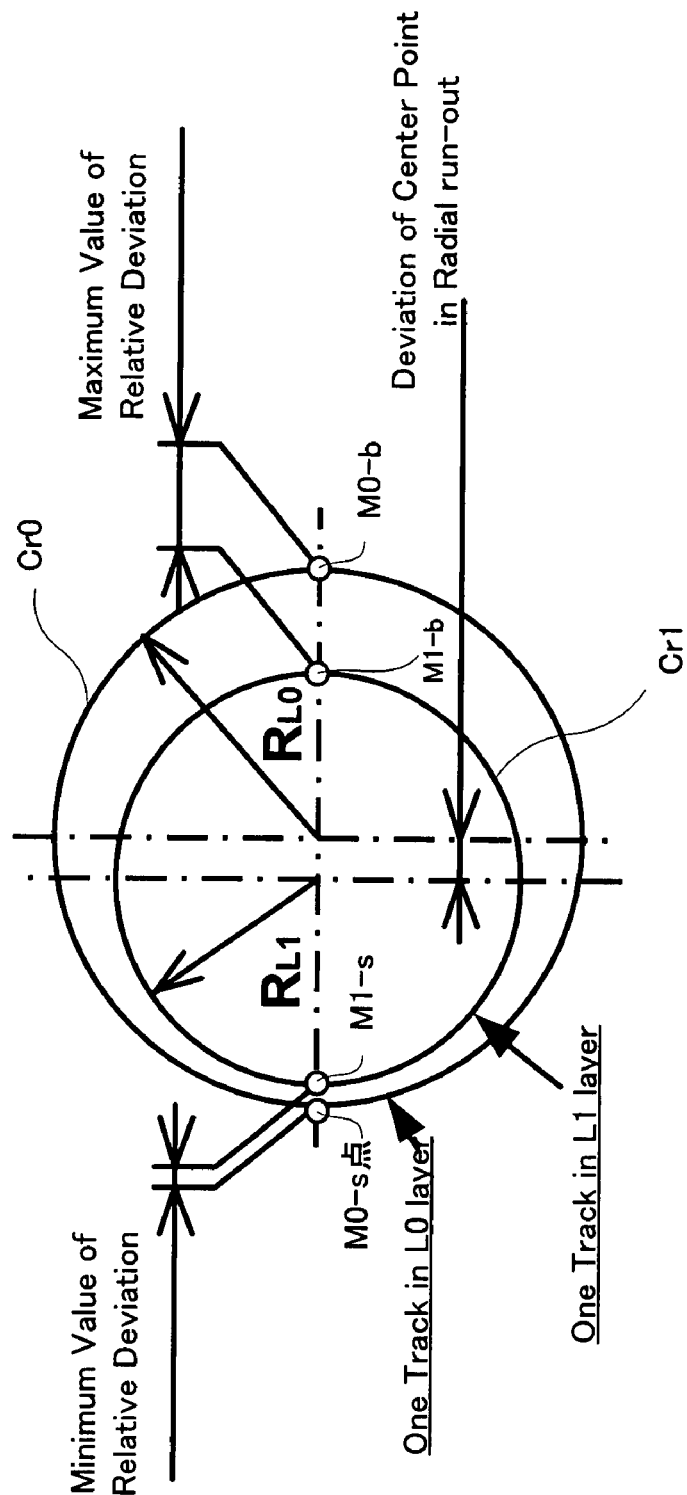

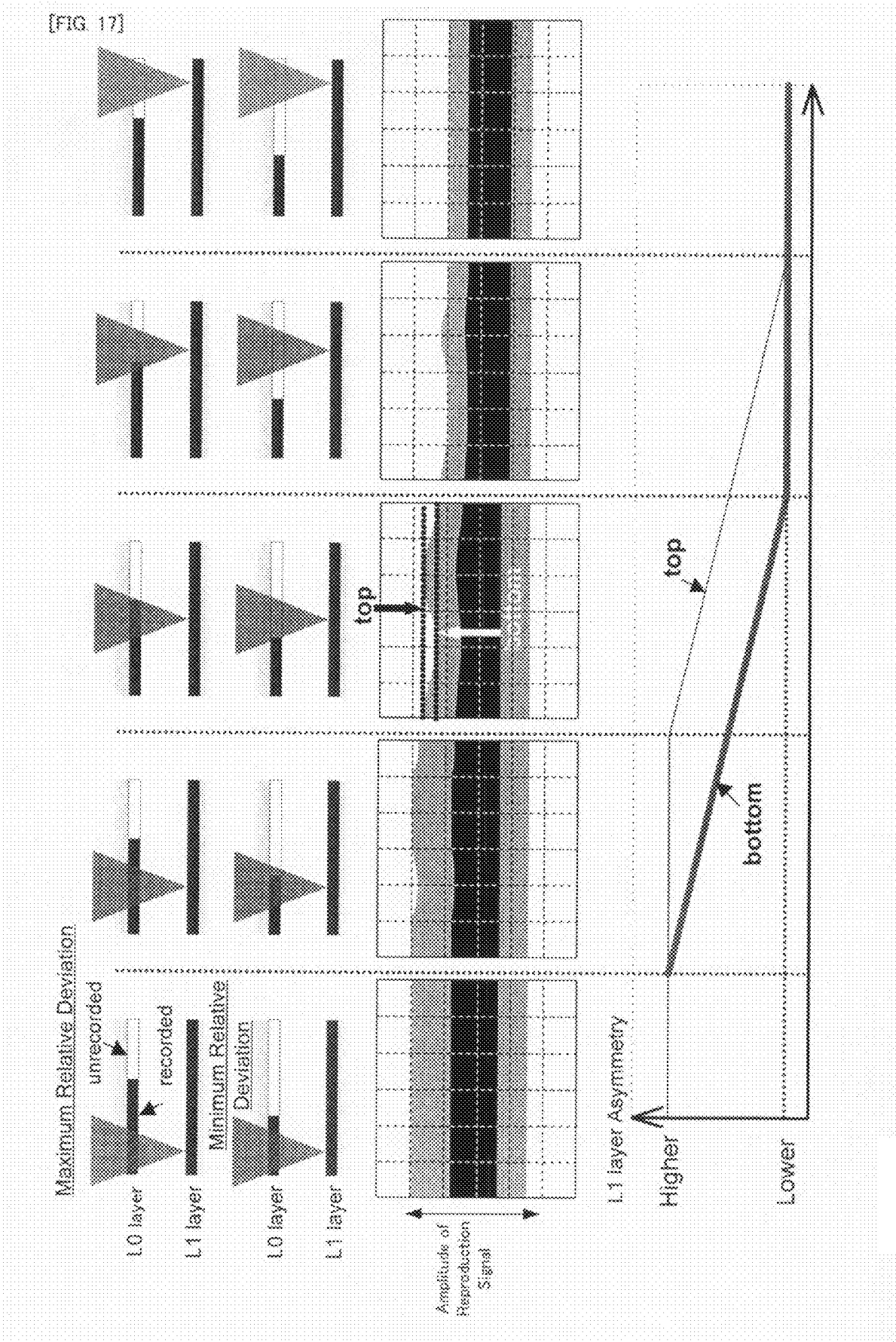

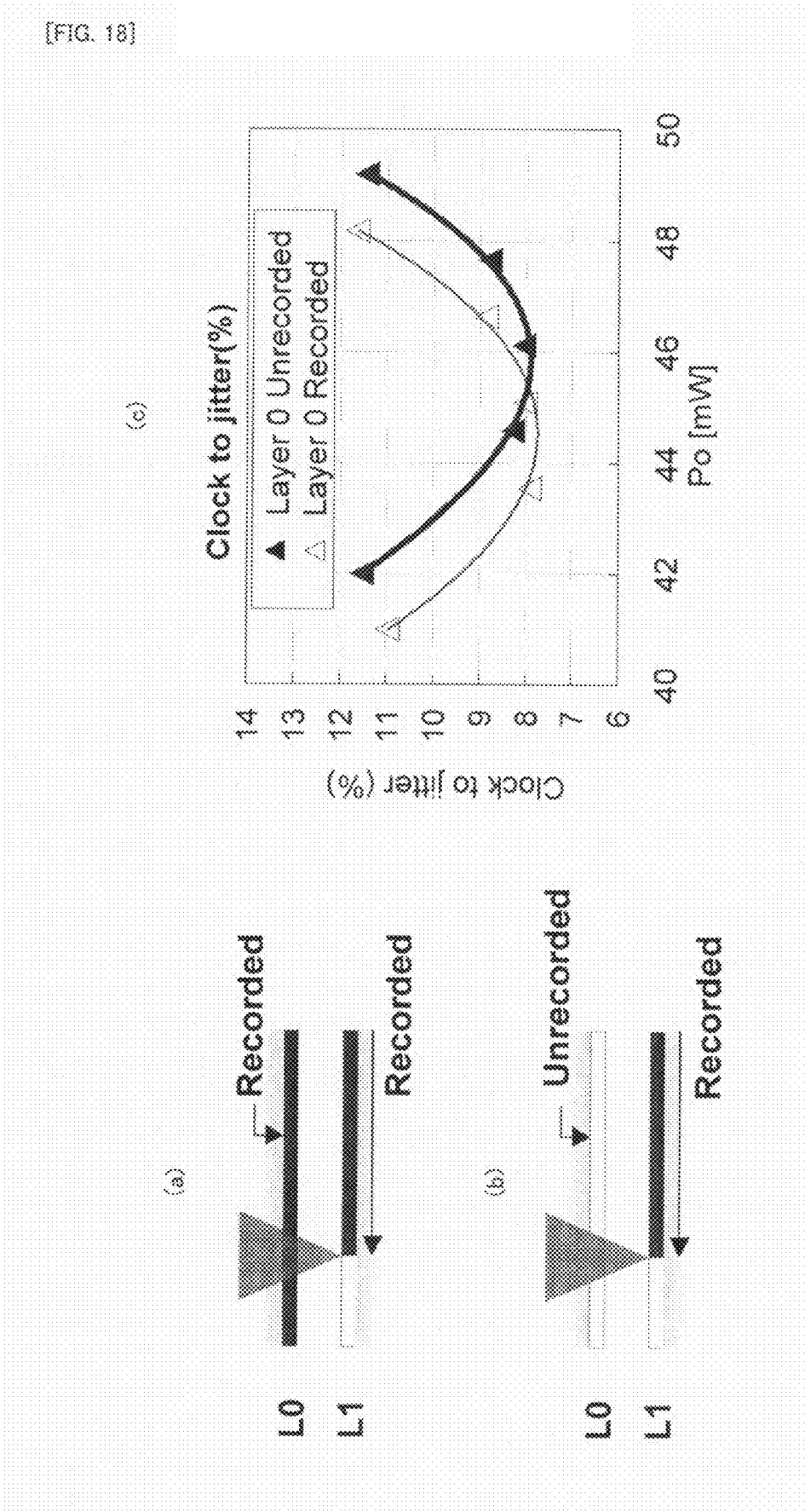
[FIG. 18]

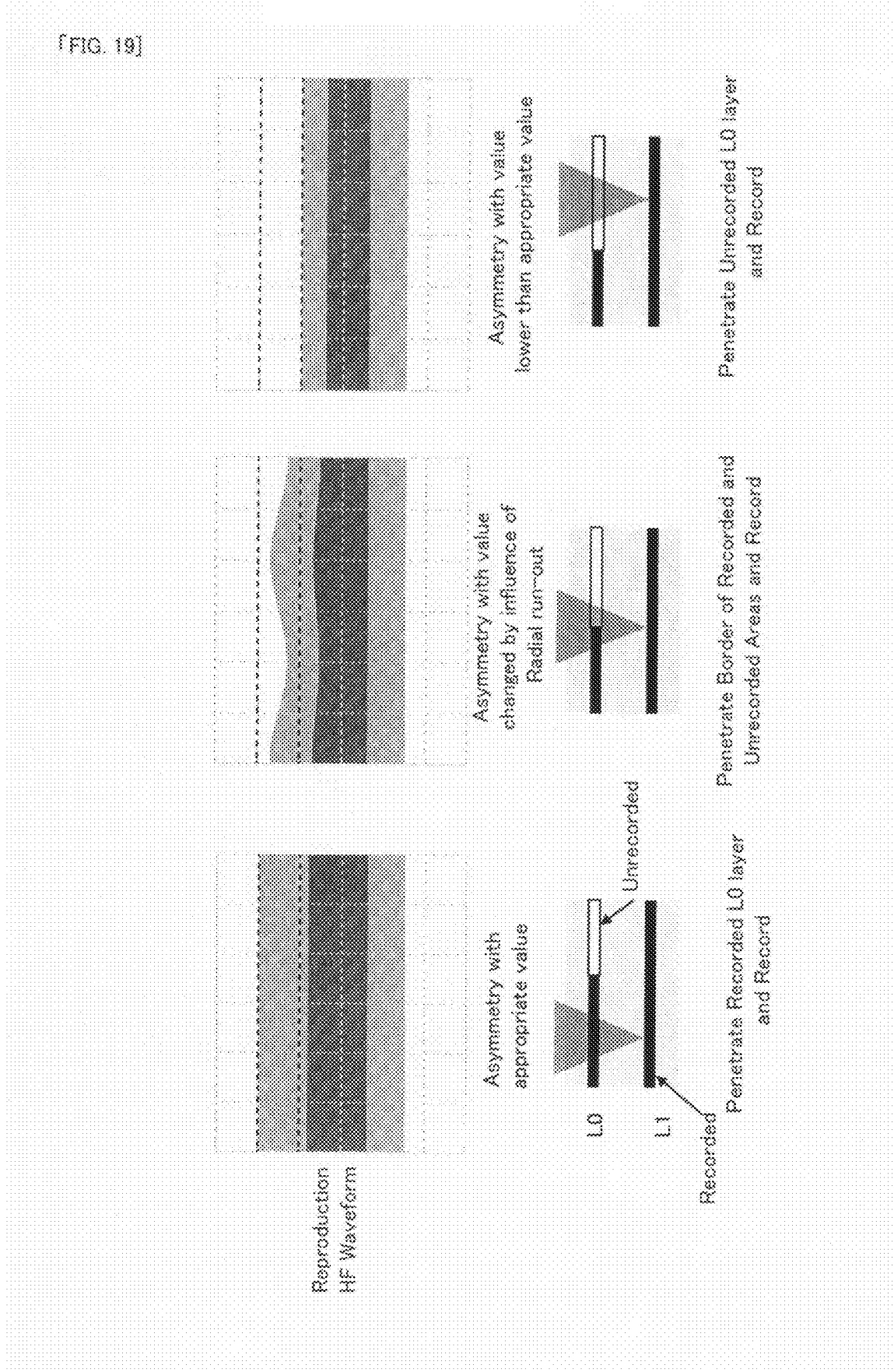

[FIG. 20]
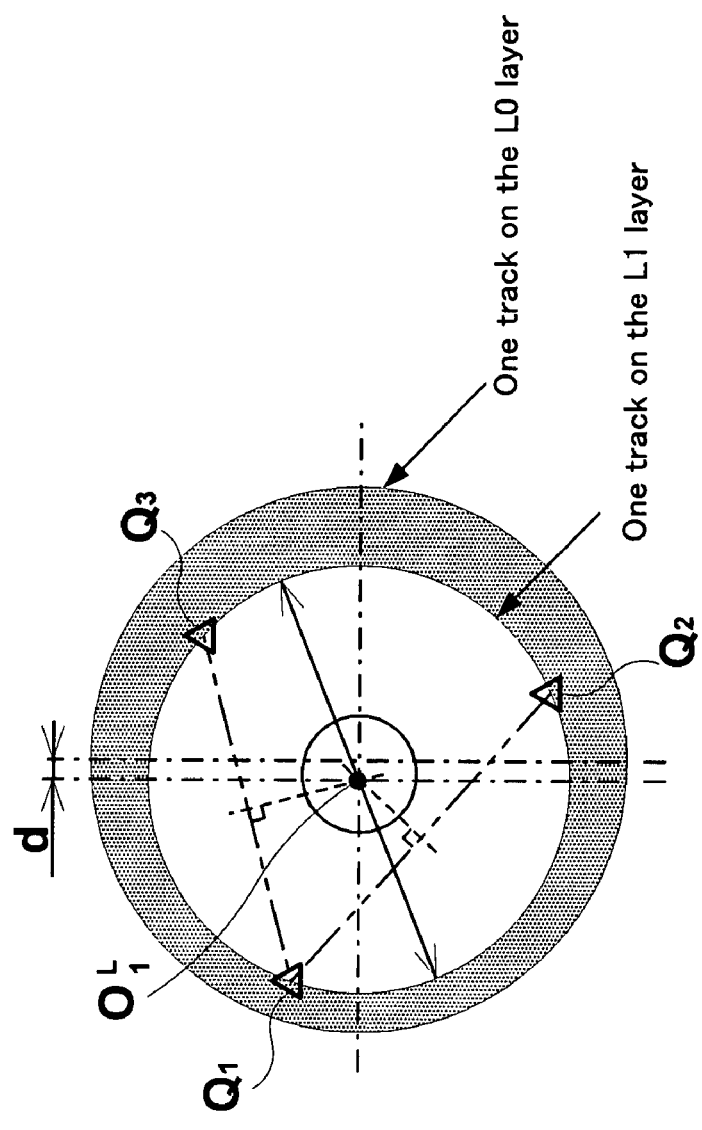

POSITION VERIFYING APPARATUS AND METHOD, POSITION MEASURING APPARATUS AND METHOD, AND COMPUTER PROGRAM FOR POSITION VERIFICATION OR POSITION MEASUREMENT

TECHNICAL FIELD

The present invention relates to a position verifying apparatus for and method of verifying a relative shift in a plurality of recording layers, in a multilayer type information recording medium, such as a two-layer type DVD and CD (Compact Disc), for example, as well as a position measuring apparatus and method, and a computer program for position verification or position measurement.

BACKGROUND ART

In an information recording medium, such as a CD-ROM (Compact Disc-Read Only Memory), a CD-R (Compact Disc-Recordable), a DVD-ROM, a DVD-R, a DVD-RW, and a DVD+R, for example, as described in patent documents 1 and 2 or the like, there is also developed an information recording medium, such as a multilayer type or dual layer type optical disc, in which a plurality of recording layers are stacked or bonded on the same substrate. Then, on an information recording apparatus, such as a DVD recorder, for performing the recording with respect to the dual layer type, i.e., two-layer type, optical disc, laser light for recording is focused on a recording layer located on the front (i.e. on the closer side to an optical pickup) as viewed from the irradiation side of the laser light (hereinafter referred to as an "L0 layer", as occasion demands) to thereby record information into the L0 layer in an irreversible change recording method by heat or a rewritable method. Moreover, the laser light is focused on a recording layer located on the rear of the L0 layer (i.e. on the farther side from the optical pickup) as viewed from the irradiation side of the laser light (hereinafter referred to as an "L1 layer", as occasion demands), through the L0 layer or the like, to thereby record information into the L1 layer.

When information is recorded into the L1 layer, which constitutes such a two-layer type optical disc, the optimum recording power of the laser light with which the L1 layer is irradiated through the recorded L0 layer, as shown in FIG. 18(a), is 44.5 (mW: milliwatt) at which a jitter value is minimum on a parabolic curve in a thin line (with white triangles) in FIG. 18(c), for example. On the other hand, the optimum recording power of the laser light with which the L1 layer is irradiated through the unrecorded L0 layer which has a different light transmittance from that of the recorded L0 layer, as shown in FIG. 18(b), is 46 (mW: milliwatt) at which a jitter value is minimum on a parabolic curve in a thick line (with black triangles) in FIG. 18(c), for example. Thus, there is a need to consider whether or not the L0 layer is recorded, in the case of the recording in the L1 layer. With respect to this, there is devised or invented a recording method in which a so-called recording order is satisfied, which is that the laser light for recording which has penetrated the L0 layer in the recorded state is to be irradiated, for example.

However, in producing such a two-layer type information recording medium, the L0 layer and the L1 layer are formed by different stampas, and are bonded or stacked. Thus, there is a possibility to cause an eccentricity due to a bonding error, in the L0 layer and the L1 layer. Alternatively, since the L0 layer and the L1 layer are formed by different stampas, there likely arises deviation in a track pitch in each recording layer, or there likely arises deviation, a so-called dimensional error, in an absolute radial position with respect to a reference address in each recording layer. These cause a shift in the radial position of a recording area in the L1 layer which is associated with a recording area in the L0 layer by address information, such as a pre-format address, for example, and thus there arises a possibility that the above-mentioned recording order is not necessarily satisfied.

More specifically, it is assumed that the recording is performed with a recording power which is optimized in the recording after the penetration of the recorded L0 layer. When the information is recorded into the L1 layer, as shown in a left part of FIG. 19, if the laser light for recording which has penetrated the L0 layer in the recorded state is irradiated on a single track, the amplitude of a reproduction signal is large, and good signal quality is obtained. In other words, an asymmetry value, which is one example of the signal quality, is appropriate. On the other hand, as shown in a right part of FIG. 19, if the laser light for recording which has penetrated the L0 layer in the unrecorded state is irradiated, the amplitude of a reproduction signal is small, and good signal quality is not obtained. In other words, the asymmetry value is not appropriate. On the other hand, as shown in a middle part of FIG. 19, if the laser light for recording which has penetrated the L0 layer in which the recorded area and the unrecorded area are mixed is irradiated on a single track, the amplitude of a reproduction signal varies depending on the extent of an eccentric amount or a radial run-out. In other words, the asymmetry value transits from one to the other out of the appropriate level and the inappropriate level.

In order to eliminate the deviation of the optimum recording power due to the relative shift, if a recording apparatus detects the recording state of the recording area in the L0 layer which is associated with the recording area in the L1 layer, a recording control process becomes complicated because it is necessary to accurately recognize the above-mentioned relative shift. On the other hand, if the information is recorded in disregard of the deviation of the optimum recording power due to the relative shift, the control becomes complicated; for example, a process parameter for obtaining a binary signal is to be dynamically changed, on a reproducing apparatus for reproducing the recorded information, which increases a load in the reproduction process.

Thus, the inventors of the present invention propose an information recording medium in which it is possible to define an error between the address information and the radial position caused by the above-mentioned relative shift to be within tolerance.

In general, in order to measure the relative shift caused on the two-layer type optical disc, i.e., the error between the radial position at one address in the L0 layer and the radial position at another address in the L1 layer which is associated with the one address, there are two methods devised or invented as follows.

The first method is to measure the radial position of an optical head (hereinafter referred to as a "PU: Pickup", as occasion demands) for irradiating and receiving laser light. In this method, it is possible to detect the radial position associated with a desired address, on the basis of the rotation center position of the disc and the relative position of the PU, while the desired address is read by the PU in each of the L0 layer and the L1 layer. More specifically, a position measuring device, such as a position sensor provided with the laser light and an encoder, measures the position of the PU main body, or the position of an objective lens for focusing the laser light. Moreover, by analyzing the measured position of the objective lens in time series, it is possible to analyze the state that the track of the L0 layer and the track of the L1 layer are rotated with an eccentricity. As described above, according to the first method, it is possible to measure the radial positions at an arbitrary address in the L0 layer and the L1 layer, highly accurately.

The second method is to use a microscope which can measure two-dimensional coordinates. In this method, a track on the disc is observed under the microscope, and the plane coordinates of three arbitrary points on the substantially circular track are measured, to thereby detect the center coordinates and the radius of the track. More specifically, it is possible to detect center coordinates "OL1" from three points ("Q1" to "Q3") shown in FIG. 20. Moreover, it is possible to detect a relative position relationship of two tracks, by performing this coordinate measurement in the L0 layer and the L1 layer. The distance "d" shown in FIG. 20 allows the detection of the eccentricity in the radial direction between the L0 layer and the L1 layer. In particular, pre-recording onto the track including a desired address facilitates the detection of the track in this coordinate measurement. In the second method, it is possible to easily measure the radial position at an arbitrary address, as in the first method. In addition, the center coordinates and the radius of a track in each layer can be simultaneously detected, so that it is possible to directly understand the relative position relationship.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

In the above-mentioned first method, however, there is such a technical problem that exclusive measuring equipment in which a relatively expensive measuring apparatus is incorporated, such as a position measuring apparatus which can measure the displacement of laser light, is to be used for the purpose of the highly accurate measurement of the radial position at an arbitrary address.

In addition, in the above-mentioned second method, there is such a technical problem that a relatively expensive measurement system is to be used since the microscope which can measure two-dimensional coordinates is used. Moreover, there is such a technical problem that in a calculation process of calculating the center coordinates and the radius from three arbitrary points on the track, errors are easily appeared and there is a possibility that the measurement cannot be performed, highly accurately.

It is therefore an object of the present invention to provide a position verifying apparatus and method which can verify a relative shift on an information recording medium having a plurality of recording layers, for example, at lower cost and with ease, as well as a position measuring apparatus and method, and a computer program which makes a computer function as the position verifying apparatus or the position measuring apparatus.

Means for Solving the Subject (Position Verifying Apparatus)

The position verifying apparatus of the present invention will be explained hereinafter.

The above object of the present invention can be achieved by a position verifying apparatus for verifying extent of a relative shift in a radial direction (i) between a first recording layer and a second recording layer or (ii) between a first track and a second track, in an information recording medium provided with at least: the first recording layer (L0 layer) in which the first track (which can display a relationship between an address and a radial position in the L0 layer) to record therein information is formed, and the second recording layer (L1 layer) in which the second track (which can display a relationship between an address and a radial position in the L1 layer) to record therein the information is formed, the position verifying apparatus provided with: a first recording device for recording the information into a first area of the first recording layer; a second recording device (iii) for recording a part of the information by laser light which has penetrated the first area and (iv) for recording another part of the information by laser light which does not penetrate the first area, into a second area of the second recording layer including at least a partial area which faces the first area; a reproducing device for reproducing the part of the information and the another part of the information, recorded in the second area; and a judging device for judging whether or not the relative shift is within tolerance, on the basis of a transit position at which reproduction quality transits from one to the other out of the reproduction quality indicated by the part of the information reproduced and the reproduction quality indicated by the another part of the information reproduced.

According to the position verifying apparatus of the present invention, at first, by the first recording device, the information is recorded into the first area of the first recording layer, for example, along the first track. Then, by the second recording device, a part of the information is recorded by laser light which has penetrated the first area, for example, along the second track, and another part of the information is recorded by laser light which does not penetrate the first area, into the second area of the second recording layer including at least the partial area which faces the first area. The term "face" herein may mean a position relationship in which the radial positions are substantially the same, in the two recording layers which face each other, and it may mean a position relationship in which the radial positions are substantially the same including a predetermined margin or the like.

Specifically, the first track may be directed from one side to the other side out of the inner circumferential side and the outer circumferential side of a disc-shaped substrate, for example. On the contrary, the second track may be directed from the other side to the one side. In other words, in the two-layer type or multilayer type information recording medium, continuous recording can be performed in an "opposite manner" in which tracks for recording are in opposite directions in two recording layers. Therefore, if the recording is continuously performed from the end edge of the first recording layer to the start edge of the second recording layer, it is hardly or not necessary to change at all the irradiation position of the laser light on the substrate surface, in the radial direction, in changing the recording layer targeted for an information recording process or reproduction process. Thus, it is possible to perform quick layer jump (i.e. layer changing operation). This is extremely useful in practice, in the point that it facilitates uninterrupted reproduction without a special buffer function to change the recording layer, in recording the continuous record information, such as a movie, for example.

Alternatively, the first recording track may be directed from one side to the other side out of the above-mentioned inner and outer circumferential sides, and the second recording track may be also directed from the one side to the other side, as in the first recording track. In other words, in the two-layer type or multilayer type information recording medium, the continuous recording can be performed in a "parallel manner" in which the recording tracks are in the same direction in the two recording layers. In the parallel manner, if the recording or reproduction is ended in the first recording layer, an optical pickup, located on the most outer circumference, needs to be displaced to the most inner circumference again when the recording or reproduction is started in the second recording layer. Thus, as compared to the opposite manner described above, it takes more time to change the first recording layer to the second recording layer, by that much.

Then, by the reproducing device, the part of the information and the another part of the information, recorded in the second area, is reproduced.

Then, by the judging device, it is judged whether or not the relative shift is within tolerance, on the basis of the transit position at which reproduction quality transits from one to the other out of both the reproduction quality indicated by the part of the information reproduced and the reproduction quality indicated by the another part of the information reproduced.

If the relative shift is not within the tolerance, there arises a contradiction between the transit position and an estimated area in which it is estimated that it is possible to obtain the reproduction quality which is substantially equal to the reproduction quality indicated by the information recorded by the laser light which has penetrated the first area in the first recording layer in the case that the relative shift in the first recording layer and the second recording layer is within the tolerance. Therefore, the judging device can easily judge whether or not the relative shift is within the tolerance, on the basis of the position relationship between the transit position and the estimated area, for example. In addition, the judging device can also judge whether or not the relative shift is within the tolerance, more easily, on the basis of the reproduction quality in the estimated area.

Moreover, if one conventional method is used, special measuring equipment in which a relatively expensive measuring apparatus is incorporated, such as a position measuring apparatus which can measure the displacement of laser light, is to be used for the purpose of the highly accurate measurement of the radial position at an arbitrary address. Alternatively, if another conventional method is used, a relatively expensive measurement system is to be used since a microscope which can measure two-dimensional coordinates is used. In addition, in a calculation process of calculating the center coordinates and the radius from three arbitrary points on the track, errors are easily appeared and there is a possibility that the measurement cannot be performed highly accurately.

As opposed to this, according to the present invention, it can be provided with a general-purpose apparatus, such as an oscilloscope and a PC, so that it is possible to verify the relative shift, i.e., an error in the radial position, at the addresses in the first recording layer and the second recording layer, at lower cost and easily.

In one aspect of the position verifying apparatus of the present invention, the first area can be specified by a first address range which indicates a range from a first start address to a first end address, the second area includes an estimated area which can be specified by an estimated address range which indicates a range, theoretically associated with the first address range, and the judging device judges whether or not the relative shift is within the tolerance, on the basis of both a position in the estimated area and the transit position.

According to this aspect, by the judging device, it is easily judged whether or not the relative shift is within the tolerance, on the basis of both the position in the estimated area and the transit position. The "estimated area" of the present invention herein is an area (i) which can be specified by the estimated address range which indicates the range theoretically associated with the first address range which indicates the first area and (ii) in which it is estimated that it is possible to obtain the reproduction quality which is substantially equal to the reproduction quality indicated by the information recorded by the laser light which has penetrated the first area in the first recording layer if the relative shift in the first recording layer and the second recording layer is within the tolerance. Moreover, the term "associated" in the present invention means that it is possible to uniquely specify another address from one address, one-to-one. Specifically, if one address and another address are in a complement number relationship, it can be said that one address and another address are associated. In addition, the relationship may include the relative deviation as a margin.

In an aspect related to the above-mentioned transit position and position in the estimated area, the transit position or the position in the estimated area may be indicated by an address or a radial position, based on one of the first recording layer and the second recording layer.

By such construction, by the judging device, it is quickly and easily judged whether or not the relative shift is within the tolerance, on the basis of the address or the radial position which indicates the position in the estimated area and the transit position.

In an aspect related to the above-mentioned estimated area, it may be constructed such that the estimated area can be further specified so as to include relative deviation which has at least one of (i) a dimensional error held by each of the first recording layer and the second recording layer, (ii) a radial run-out caused on the basis of a bonding error in the first recording layer and the second recording layer, and (iii) a radius of transmitted light which indicate a radius of an area in which the laser light is irradiated to penetrate the first recording layer but not to focus on the first recording layer when the laser light is irradiated to focus on the second recording layer.

By such construction, the judgment can be performed by the judging device, without an influence of the dimensional error, the eccentric amount or radial run-out, or the radius of transmitted light which may cause the relative shift. Therefore, by the judging device, it is possible to judge whether or not the relative shift is within the tolerance, highly accurately and easily, on the basis of the position in the estimated area and the transit position.

In an aspect related to the above-mentioned estimated area, it may be constructed such that the estimated area can be further specified by at least both a second start address (G point) associated with the first start address and a second end address (H point) associated with the first end address.

By such construction, the estimated area can be specified, on the basis of (i) the first start address and the first end address which indicate the first area, and (ii) the relative shift in the tolerance. Thus, at least two points included in the estimated area can be also specified, on the basis of (iii) the second start address and the second end address, and (iv) the relative shift in the tolerance.

Therefore, by the judging device, it can be quickly and easily judged whether or not the relative shift is within the tolerance, on the basis of the reproduction quality at the second start address and the second end address.

Moreover, in an aspect related to the above-mentioned estimated area, it may be constructed such that the estimated area can be further specified by a margin start address obtained by adding or subtracting a margin address, which indicates an address corresponding to the relative deviation, at the second start address (corresponding to G point), and a margin end address obtained by subtracting or adding the margin address at the second end address (corresponding to H point).

By such construction, by the judging device, it can be highly accurately and easily judged whether or not the relative shift is within the tolerance, on the basis of the reproduction quality at the margin start address and the margin end address.

In another aspect of the position verifying apparatus of the present invention, a predetermined length in the radial direction in the first recording layer and the second recording layer can be numerically designated on the basis of a record line density which indicates a data amount per unit length in the first track and the second track and which can be calculated at least in a desired range.

According to this aspect, if the record line density is constant in the recording layer, it is possible to easily derive position information, such as the address which indicates the estimated area, based on the predetermined length, on the basis of the area size of the recording area of the optical disc.

In an aspect related to the predetermined length, the data amount associated with the predetermined length may be indicated by an area size corresponding to the predetermined length divided by a predetermined coefficient.

By such construction, it is possible to derive the position information, such as the address which indicates the estimated area, based on the predetermined length, more easily.

In an aspect related to the predetermined length, the data amount associated with the predetermined length may be indicated by spiral integration calculation, performed from an address which indicates a start edge of the predetermined length to an address which indicates an end edge of the predetermined length.

By such construction, it is possible to derive the position information, such as the address which indicates the estimated area, based on the predetermined length, more highly accurately.

In another aspect of the position verifying apparatus of the present invention, the reproduction quality is indicated by an asymmetry value.

According to this aspect, by the judging device including an oscilloscope or the like, for example, it is highly accurately and easily judged whether or not the relative shift is within the tolerance, on the basis of the reproduction quality, such as the asymmetry.

In another aspect of the position verifying apparatus of the present invention, the first recording device forms the first area at least at two points out of an inner circumferential part, a middle circumferential part, and an outer circumferential part, in the first recording area, the second recording device forms the second area at least at the two points in the second recording area, and the judging device judges whether or not the relative shift can be allowed at least at the two points.

According to this aspect, by the judging device, it is highly accurately and easily judged whether or not the relative shift is within the tolerance, on the basis of the reproduction quality at least at the two points on the disc.

(Position Verifying Method)

The position verifying method of the present invention will be explained hereinafter.

The above object of the present invention can be also achieved by a position verifying method in a position verifying apparatus for verifying extent of a relative shift in a radial direction (i) between a first recording layer and a second recording layer or (ii) between a first track and a second track, in an information recording medium provided with at least: the first recording layer (L0 layer) in which the first track (which can display a relationship between an address in and a radial position in the L0 layer) to record therein information is formed, and the second recording layer (L1 layer) in which the second track (which can display a relationship between an address in and a radial position in the L1 layer) to record therein the information is formed, the position verifying method provided with: a first recording process of recording the information into a first area of the first recording layer; a second recording process (iii) of recording a part of the information by laser light which has penetrated the first area and (iv) of recording another part of the information by laser light which does not penetrate the first area, into a second area of the second recording layer including at least a partial area which faces the first area; a reproducing process of reproducing the part of the information and the another part of the information, recorded in the second area; and a judging process of judging whether or not the relative shift is within tolerance, on the basis of a transit position at which reproduction quality transits from one to the other out of the reproduction quality indicated by the part of the information reproduced and the reproduction quality indicated by the another part of the information reproduced.

According to the position verifying method of the present invention, it is possible to receive the various benefits owned by the above-mentioned position verifying apparatus of the present invention.

Incidentally, in response to the various aspects of the position verifying apparatus of the present invention described above, the position verifying method of the present invention can adopt various aspects.

(Position Measuring Apparatus)

The position measuring apparatus of the present invention will be explained hereinafter.

The above object of the present invention can be also achieved by a position measuring apparatus for measuring extent of a relative shift in a radial direction (i) between a first recording layer and a second recording layer or (ii) between a first track and a second track, in an information recording medium provided with at least: the first recording layer in which the first track to record therein information is formed, and the second recording layer in which the second track to record therein the information is formed, the position measuring apparatus provided with: a first recording device for recording the information into a first area of the first recording layer; a second recording device (iii) for recording a part of the information by laser light which has penetrated the first area and (iv) for recording another part of the information by laser light which does not penetrate the first area, into a second area of the second recording layer including at least a partial area which faces the first area; a reproducing device for reproducing the part of the information and the another part of the information, recorded in the second area; and a measuring device for measuring (v) a dimensional error held by each of the first recording layer and the second recording layer or (vi) a radial run-out caused on the basis of a bonding error in the first recording layer and the second recording layer, as the relative shift, on the basis of a transit position at which reproduction quality transits from one to the other out of the reproduction quality indicated by the part of the information reproduced and the reproduction quality indicated by the another part of the information reproduced.

According to the position measuring apparatus of the present invention, at first, by the first recording device, the information is recorded into the first area of the first recording layer, for example, along the first track. Then, by the second recording device, a part of the information is recorded by laser light which has penetrated the first area, for example, along the second track, and another part of the information is recorded by laser light which does not penetrate the first area, into the second area of the second recording layer including at least the partial area which faces the first area.

Then, by the reproducing device, the part of the information and the another part of the information, recorded in the second area, is reproduced.

Then, by the measuring device, (v) the dimensional error held by each of the first recording layer and the second recording layer or (vi) the radial run-out caused on the basis of a bonding error in the first recording layer and the second recording layer is measured, as the relative shift, on the basis of the transit position at which reproduction quality transits from one to the other out of the reproduction quality indicated by the part of the information reproduced and the reproduction quality indicated by the another part of the information reproduced.

Consequently, according to the present invention, it can be provided with a general-purpose apparatus, such as an oscilloscope and a PC, so that it is possible to measure the extent of the relative shift, such as (v) the dimensional error and (vi) the radial run-out, at lower cost and easily.

(Position Measuring Method)

The position measuring method of the present invention will be explained hereinafter.

The above object of the present invention can be also achieved by a position measuring method in a position measuring apparatus for measuring extent of a relative shift in a radial direction (i) between a first recording layer and a second recording layer or (ii) between a first track and a second track, in an information recording medium provided with at least: the first recording layer in which the first track to record therein information is formed, and the second recording layer in which the second track to record therein the information is formed, the position measuring method provided with: a first recording process of recording the information into a first area of the first recording layer; a second recording process (iii) of recording a part of the information by laser light which has penetrated the first area and (iv) of recording another part of the information by laser light which does not penetrate the first area, into a second area of the second recording layer including at least a partial area which faces the first area; a reproducing process of reproducing the part of the information and the another part of the information, recorded in the second area; and a measuring process of measuring (v) a dimensional error held by each of the first recording layer and the second recording layer or (vi) a radial run-out caused on the basis of a bonding error in the first recording layer and the second recording layer, as the relative shift, on the basis of a transit position at which reproduction quality transits from one to the other out of the reproduction quality indicated by the part of the information reproduced and the reproduction quality indicated by the another part of the information reproduced.

According to the position measuring method of the present invention, it is possible to receive the various benefits owned by the above-mentioned position measuring apparatus of the present invention.

Incidentally, in response to the various aspects of the position measuring apparatus of the present invention described above, the position measuring method of the present invention can adopt various aspects.

(Computer Program)

The computer program of the present invention will be discussed hereinafter.

The above object of the present invention can be also achieved by a computer program of instructions for position verification and for tangibly embodying a program of instructions executable by a computer provided in the above-mentioned position verifying apparatus of the present invention (including its various aspects), to make the computer function as at least one of the first recording device, the second recording device, the reproducing device, and the judging device.

The above object of the present invention can be also achieved by a computer program of instructions for position verification and for tangibly embodying a program of instructions executable by a computer provided in the above-mentioned position measuring apparatus of the present invention (including its various aspects), to make the computer function as at least one of the first recording device, the second recording device, the reproducing device, and the measuring device.

According to the computer program of the present invention, the above-mentioned position verifying apparatus or position measuring apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the position verifying apparatus or position measuring apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned position verifying apparatus of the present invention (including its various aspects), to make the computer function as at least one of the first recording device, the second recording device, the reproducing device, and the judging device.

The above object of the present invention can be also achieved by a computer program product in a computer-readable medium for tangibly embodying a program of instructions executable by a computer provided in the above-mentioned position measuring apparatus of the present invention (including its various aspects), to make the computer function as at least one of the first recording device, the second recording device, the reproducing device, and the measuring device.

According to the computer program product of the present invention, the above-mentioned position verifying apparatus or position measuring apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned position verifying apparatus or position measuring apparatus.

These effects and other advantages of the present invention will become more apparent from the following embodiments.

As explained above, according to the position verifying apparatus of the present invention, it is provided with: the first recording device; the second recording device; the reproducing device; and the judging device. According to the position verifying method of the present invention, it is provided with: the first recording process; the second recording process; the reproducing process; and the judging process. Therefore, by the position verifying apparatus provided with a general-purpose apparatus, such as an oscilloscope, it is possible to verify the relative shift, i.e., a difference in the radial position, at the addresses in the first recording layer and the second recording layer, at lower cost and easily.

Moreover, according to the position measuring apparatus of the present invention, it is provided with: the first recording device; the second recording device; the reproducing device; and the measuring device. According to the position verifying method of the present invention, it is provided with: the first recording process; the second recording process; the reproducing process; and the measuring process. Therefore, by the position measuring apparatus provided with a general-purpose apparatus, such as an oscilloscope, it is possible to measure (v) the dimensional error or (vi) the radial run-out caused on the basis of the bonding error, as the relative shift, at lower cost and easily.

Moreover, according to the computer program of the present invention, it makes a computer function as the above-mentioned position verifying apparatus, so that it enables the position verifying apparatus to verify the relative shift, i.e., a difference in the radial position, at the addresses in the first recording layer and the second recording layer, at lower cost and easily.

Furthermore, according to the computer program of the present invention, it makes a computer function as the above-mentioned position measuring apparatus, so that it enables the position measuring apparatus to measure (v) the dimensional error held by each of the first recording layer and the second recording layer or (vi) the radial run-out caused on the basis of the bonding error in the first recording layer and the second recording layer, as the relative shift, as the relative shift, at lower cost and easily.

BRIEF DESCRIPTION OF DRAWINGS

FIG. 1 are a substantial plan view (FIG. 1(a)) showing the basic structure of an optical disc having a plurality of recording areas, in an embodiment of the information recording medium of the present invention, and a schematic cross sectional view of the optical disc and a corresponding conceptual view (FIG. 1(b)) showing a recording area structure in the radial direction.

FIG. 2 are a graph (FIG. 2(a)) showing one specific example of a relationship between an address and a radial position in an L0 layer and an L1 layer, which are related to the first recording layer and the second recording layer of the present invention, respectively, and a graph (FIG. 2(b)) showing another specific example.

FIG. 3 are a schematic diagram (FIG. 3(a)) conceptually showing a dimensional error held by each of the L0 layer and the L1 layer, which are related to the first recording layer and the second recording layer of the present invention, and a schematic diagram (FIG. 3(b)) conceptually showing a radial run-out (or an eccentric amount) caused on the basis of a bonding error in the L0 layer and the L1 layer.

FIG. 4 is a schematic diagram conceptually showing the radius of an area (irradiation area) in which laser light is irradiated to penetrate the L0 layer but not to focus on the L0 layer, which is related to the first recording layer of the present invention, when the laser light is irradiated to focus on the L1 layer, which is related to the second recording layer of the present invention.

FIG. 5 is a graph showing one specific example of the relationship between the address and the radial position in the case where the dimensional error or the bonding error (or radial run-out) is caused in the L0 layer and the L1 layer, which are related to the first recording layer and the second recording layer of the present invention.

FIG. 6 is a block diagram showing the basic structures of an information recording/reproducing apparatus in an embodiment of the position verifying apparatus of the present invention, and a host computer.

FIG. 7 is a flowchart showing a recording operation by the information recording/reproducing apparatus, according to the embodiment of the position verifying apparatus of the present invention.

FIG. 8 is a schematic diagram schematically showing one example of an entire area 11 in the L1 layer, which is related to the "second area" of the present invention, a recording area 10 in the L0 layer, which is related to the "first area" of the present invention, and the data amounts of the entire area 11 and the recording area 10.

FIG. 9 are a schematic diagram (FIG. 9(a)) schematically showing an estimated area 12 related to the "estimated area" of the present invention, the recording area 10 in the L0 layer related to the "first area" of the present invention, and transit of an asymmetry value as being one example which represents reproduction quality in the estimated area 12, a graph (FIG. 9(b)) showing transit to one state of the asymmetry value in the estimated area 12 in the L1 layer, and a graph (FIG. 9(c)) showing transit to another state of the asymmetry value in the estimated area 12 in the L1 layer.

FIG. 10 is a schematic diagram schematically showing addresses of two points ("J point" and "K point") included in the estimated area 12 in the L1 layer related to the "estimated area" of the present invention.

FIG. 11 is a schematic diagram schematically showing (i) a situation in which the asymmetry value, as being one example which represents the reproduction quality near the outer circumferential edge of the estimated area 12 in the L1 layer related to the "estimated area" of the present invention, gradually transits from an appropriate level to an inappropriate level, and (ii) a position relationship between laser light and both the recording area 10 in the L0 layer related to the "first area" of the present invention and the estimated area 12, the position relationship being associated with the transit of the asymmetry value.

FIG. 12 are a graph (FIG. 12(a)) schematically showing the relationship between the address and the radial position in both the estimated area 12 in the L1 layer related to the "estimated area" of the present invention and the recording area 10 in the L0 layer related to the "first area" of the present invention, and a schematic diagram (FIG. 12(b)) schematically showing the transit of the asymmetry value as being one example of the reproduction quality in the estimated area 12.

FIG. 13 are one and another conceptual views (FIG. 13(a) and FIG. 13(b)) showing a procedure in which the radial position is calculated from one address in the present invention.

FIG. 14 are a graph (FIG. 14(a)) schematically showing the relationship between the address and the radial position in both the estimated area 12 in the L1 layer and the recording area 10 in the L0 layer, in an optical disc in a comparison example, and a schematic diagram (FIG. 14(b)) schematically showing the transit of the asymmetry value as being one example of the reproduction quality in the estimated area 12 in the comparison example.

FIG. 15 are a schematic diagram (FIG. 15(a)) schematically showing the transit of the asymmetry value as being one example of the reproduction quality which is actually measured on an information recording medium including the eccentricity of the estimated area 12 in the case where a bonding error (or eccentricity) and the radius of transmitted light are included, in a second embodiment of the present invention, and a graph (FIG. 15(b)) showing the transit of the asymmetry value in the entire area 11 in the ideal case in which the dimensional error in the L0 layer and the L1 layer is a reference value within tolerance (dashed line), and the transit of the asymmetry value actually in the L1 layer which is actually measured on the information recording medium including the dimensional error (thick line).

FIG. 16 is a plan view schematically showing a position relationship between one track in the L0 layer and another track in the L1 layer which is associated with the one track, in the case where the dimensional error, the bonding error (or radial run-out), and the radius of the transmitted light are caused in the L0 layer and the L1 layer which are related to the first recording layer and the second recording layer, respectively, in the second embodiment of the present invention.

FIG. 17 is a schematic diagram showing the transit of the asymmetry value as begin one example of the reproduction quality in the case where relative deviation in the second embodiment of the present invention is maximum, and the transit of the reproduction quality in the case where the relative deviation is minimum.

FIG. 18 are schematic diagrams (FIG. 18(a) and FIG. 18(b)) conceptually showing the recording order of the present invention, and a graph (FIG. 18(c)) numerically showing the recording order.

FIG. 19 is a schematic diagram showing problems in the comparison example.

FIG. 20 is a schematic diagram showing a method in the comparison example.

DESCRIPTION OF REFERENCE CODES 10 recording area
11 entire area
11a partial area
12 estimated area
100 optical disc
101 lead-in area
102 data area
103 lead-out area
104 middle area
300 information recording/reproducing apparatus
310 oscilloscope
LB laser light

BEST MODE FOR CARRYING OUT THE INVENTION

Hereinafter, the best mode for carrying out the present invention will be discussed in order for each embodiment, with reference to the drawings.

(1) Information Recording Medium

At first, with reference to FIG. 1 to FIG. 12, the embodiments of the information recording medium of the present invention will be discussed in detail. Incidentally, in the optical disc in the embodiments, an opposite manner is applied, as one specific example of a recording manner, in which the track pass of the L0 layer which constitutes one example of the "first track" of the present invention and the track pass of the L1 layer which constitutes one example of the "second track" of the present invention have opposite recording directions. Moreover, it is obvious that a parallel manner may be also applied in the embodiments.

Particularly in the embodiments, an explanation will be given on the basis of the fact that one track (one circumference) is specified by one address described later.

(1-1) Basic Structure

At first, with reference to FIG. 1(a) and FIG. 1(b), the basic structure of an optical disc according to the embodiment of the recording medium of the present invention will be discussed. FIG. 1(a) is a substantial plan view showing the basic structure of an optical disc having a plurality of recording areas in the embodiments of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101 or a lead-out area 103; a data area 102; and a middle area 104, with a center hole 1 as the center. Then, for example, on a transparent substrate 106 of the optical disc 100, there are laminated recording layers, such as an L0 layer and an L1 layer. In each recording area of the recording layers, tracks 10, such as groove tracks and land tracks, are alternately placed, spirally or concentrically, with the center hole 1 as the center. On the track 10, data is divided and recorded by a unit of ECC block 11. The ECC block 11 is a data management unit by which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

The optical disc 100 in the embodiment, as shown in FIG. 1(b), has such a structure that the L0 layer and the L1 layer, which constitute one example of the "first and second record layers" of the present invention as descried later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the upper side to the lower side in FIG. 1(b). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Incidentally, a recording/reproducing procedure in the opposite manner on the two-layer type optical disc and the like will be discussed later.

(1-2) Address and Radial Position

Next, with reference to FIG. 2, an address and a radial position on a two-layer type optical disc according to the embodiment of the information recording medium of the present invention will be discussed. FIG. 2 are a graph (FIG. 2(*a*)) showing one specific example of a relationship between the address and the radial position in the L0 layer and the L1 layer, which are related to the first recording layer and the second recording layer of the present invention, respectively, and a graph (FIG. 2(*b*)) showing another specific example. Incidentally, the horizontal axis in FIG. 2(*a*) and FIG. 2(*b*) indicates the position in the radial direction, and the vertical axis indicates the address.

As shown in FIG. 2(*a*) and FIG. 2(*b*), in one and another specific examples of the relationship between the address and the radial position in the L0 layer and the L1 layer, which are related to the first recording layer and the second recording layer of the present invention, respectively, the relationship between the address and the radial position is defined on the basis of the opposite manner. The opposite manner herein is, more specifically, such a manner that the optical pickup of an information recording/reproducing apparatus described later is displaced from the inner to the outer circumferential side, i.e. in the right direction of an arrow AR0 in FIG. 2(*a*) and FIG. 2(*b*), in the L0 layer as the recording or reproducing procedure of the two-layer type optical disc, while the optical pickup is displaced from the outer to the inner circumferential side, i.e. in the left direction of an arrow AR1 in FIG. 2(*a*) and FIG. 2(*b*), in the L1 layer, to thereby perform the recording or reproduction on the two-layer type optical disc. In the opposite manner, if the recording or reproduction is ended in the L0 layer, the optical pickup, located on the most outer circumference, does not need to be displaced again to the most inner circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel manner. This is why the opposite manner is broadly adopted in the recording of large volumes of content information.

(1-2-1) Decreasing Address and Radial Position

In one specific example of the relationship between the address and the radial position in the L0 layer and the L1 layer, which are related to the first recording layer and the second recording layer of the present invention, respectively, the address decreases in an address system based on the above-mentioned opposite manner. Incidentally, in one specific example, the laser light LB is irradiated from the upper side to the lower side, and the transit of the address in the L0 layer is illustrated in a straight line in the upper part, and the transit of the address in the L1 layer is illustrated in a straight line in the lower part.

Specifically, as shown in FIG. 2(*a*), at first, in the L0 layer, as the laser light irradiated from the optical pickup is displaced in the lead-in area 101-0, the data area 102-0, and the middle area 104-0, from the inner to the outer circumferential side, the address in the recording area of the optical disc 100 decreases. More specifically, the focal point of the laser light is displaced to the outer circumferential side from the start position (an A point in FIG. 2(*a*)) of the data area 102-0 in the L0 layer with an address of "FFCFFFh" (expressed in hexadecimal numeral) and at a radial position of "24 (mm)". Then, the focal point of the laser light is displaced to the end position (a B point in FIG. 2(*a*)) of the data area 102-0 in the L0 layer with an address of "FDD109h" and at a radial position of "58.1 (mm)", to thereby record or reproduce the information recorded in the data area 102-0 in the L0 layer.

On the other hand, in the L1 layer, the laser light is displaced in the middle area 104-1, the data area 102-1, and the lead-out area 103-1 from the outer to the inner circumferential side, the address in the recording area of the optical disc 100 decreases. More specifically, the focal point of the laser light is displaced to the inner circumferential side from the start position (a D point in FIG. 2(*a*)) of the data area 102-1 in the L1 layer with an address of "22EF6h" and at a radial position of "58.1 (mm)". Then, the focal point of the laser light is displaced to the end position (a C point in FIG. 2(*a*)) of the data area 102-1 in the L1 layer with an address of "03000h" and at a radial position of "24 (mm)", to thereby record or reproduce the information recorded in the data area 102-1 in the L1 layer.

(1-2-2) Increasing Address and Radial Position

In another specific example of the relationship between the address and the radial position in the L0 layer and the L1 layer, which are related to the first recording layer and the second recording layer of the present invention, respectively, the address increases in the address system based on the above-mentioned opposite manner. Incidentally, in another specific example, the laser light LB is irradiated from the lower side to the upper side, and the transit of the address in the L0 layer is illustrated in a straight line in the lower part, and the transit of the address in the L1 layer is illustrated in a straight line in the upper part.

Specifically, as shown in FIG. 2(*b*), at first, in the L0 layer, as the laser light irradiated from the optical pickup is displaced in the lead-in area 101-0, the data area 102-0, and the middle area 104-0, from the inner to the outer circumferential side, the address in the recording area of the optical disc 100 increases. More specifically, the focal point of the laser light is displaced to the outer circumferential side from the start position (an A point in FIG. 2(*b*)) of the data area 102-0 in the L0 layer with an address of "03000h" and at a radial position of "24 (mm)". Then, the focal point of the laser light is displaced to the end position (a B point in FIG. 2(*b*)) of the data area 102-0 in the L0 layer with an address of "22EF6h" and at a radial position of "58.1 (mm)", to thereby record or reproduce the information recorded in the data area 102-0 in the L0 layer.

On the other hand, in the L1 layer, the laser light is displaced in the middle area 104-1, the data area 102-1, and the lead-out area 103-1 from the outer to the inner circumferential side, the address in the recording area of the optical disc 100 increases. More specifically, the focal point of the laser light is displaced to the inner circumferential side from the start position (a D point in FIG. 2(*b*)) of the data area 102-1 in the L1 layer with an address of "FDD109h" and at a radial position of "58.1 (mm)". Then, the focal point of the laser light is displaced to the end position (a C point in FIG. 2(*b*)) of the data area 102-1 in the L1 layer with an address of "FFCFFFh" and at a radial position of "24 (mm)", to thereby record or reproduce the information recorded in the data area 102-1 in the L1 layer.

The value of the address at a point at one radial position in the L0 layer, related to the first recording layer of the present invention, and the value of the address at a point at one radial position the L1 layer, related to the second recording layer of the present invention, have such a relationship that bits are inverted to each other, i.e. a complement number relationship. Moreover, in the present invention, the complement number relationship is defined by a function of "Inv(x)" which indicates a complement number, as described later. Moreover, as one specific example of the address in the L0 layer and the L1 layer, an ECC block address, which is used as a land pre pit (LPP) address, for example, is applied; however, it is obvious that a so-called sector number may be applied.

(1-3) Relative Shift

Next, three types of specific examples of a relative shift caused on the two-layer type optical disc provided with the L0 layer and the L1 layer, which are related to the first recording layer and the second recording layer of the present invention, respectively, will be discussed with reference to FIG. 3 and FIG. 4. FIG. 3 are a schematic diagram (FIG. 3(*a*)) conceptually showing a dimensional error held by each of the L0 layer and the L1 layer, which are related to the first recording layer and the second recording layer of the present invention, and a schematic diagram (FIG. 3(*b*)) conceptually showing a radial run-out (or an eccentric amount) caused on the basis of a bonding error in the L0 layer and the L1 layer. FIG. 4 is a schematic diagram conceptually showing the radius of an area in which laser light is irradiated (irradiation area) to penetrate the L0 layer but not to focus on the L0 layer, which is related to the first recording layer of the present invention, when the laser light is irradiated to focus on the L1 layer, which is related to the second recording layer of the present invention.

At first, with reference to FIG. 3, the "dimensional error" and the "radial run-out (or eccentric amount)" of the present invention will be discussed.

(1-3-1) Dimensional Error

As shown in FIG. 3(*a*), each of the L0 layer and the L1 layer, which constitute the two-layer type optical disc, holds the dimensional error, as the relative shift. The "dimensional error" herein is an error between the address and the radial position held by each of the L0 layer and the L1 layer independently of each other, and it is an amount caused as the deviation between an absolute radial position at a reference address in the L0 layer and an absolute radial position at a reference address in the L1 layer, when the L0 layer and the L1 layer are pasted.

Specifically, the dimensional error is caused by each of the various processes which constitute a manufacturing process. In other words, the L0 layer and the L1 layer are manufactured by the injection molding of resin materials in a stampa which is prepared on the basis of an original disc produced by a cutting machine. Therefore, (i) there is a possibility that the original disc itself holds a radial error due to the error of the radial position of the cutting machine and the variations of the track pitch, or the like, in producing the original disc. (ii) There is a possibility that the individual difference of the optical disc other than the tolerance may be the radial error in thermal contraction upon the injection molding. (iii) Since the L0 layer and the L1 layer are separately prepared by different stampas, there is a possibility that the deviation of a track pitch in each recording layer may be included.

Specifically, a dimensional error tol is expressed by a difference between (i) the radial position of the start position (A point) of the data area 102-0 in the L0 layer with the address of "FFCFFFh", shown in FIG. 2 described above, and (ii) the radial position of the end position (C point) of the data area 102-1 in the L1 layer with the address of "03000h" and at the radial position of "24 mm". Then, the tolerance of the dimensional error tol is equal to or less than "20 µm" in the positive direction or in the negative direction, in the L0 layer, and it is also equal to or less than "20 µm" in the positive direction or in the negative direction, in the L1 layer. Thus, that means it is allowed to hold the tolerance by "40 µm" in total, in each individual of the two-layer type optical disc.

(1-3-2) Bonding Error (or Radial Run-Out)

As shown in FIG. 3(*b*), in the two-layer type optical disc, there is a possibility that a radial run-out (or an eccentric amount) due to an error in pasting the L0 layer and the L1 layer, i.e. a so-called bonding error, is caused, as the relative shift. The "radial run-out" herein is unrelated to the dimensional error held by each of the L0 layer and the L1 layer, and it is an amount caused as the deviation between an absolute radial position at a reference address in the L0 layer and an absolute radial position at a reference address in the L1 layer, when the L0 layer and the L1 layer are pasted.

Specifically, a radial run-out (or an eccentric amount) ro is expressed by a difference between the radial position of the start position (A point) of the data area 102-0 in the L0 layer with the address of "FFCFFFh", shown in FIG. 2 described above, and the radial position of the end position (C point) of the data area 102-1 in the L1 layer with the address of "03000h" and at the radial position of "24 mm". Then, the tolerance of the radial run-out ro is equal to or less than "20 µm" in the positive direction or in the negative direction, in the L0 layer, and it is equal to or less than "30 µm" in the positive direction or in the negative direction, in the L1 layer. That means it is allowed to hold it by "50 µm" in total, in each individual of the two-layer type optical disc.

As a result, it can be said that there is a possibility that the deviation between the absolute radial position at the reference address in the L0 layer and the absolute radial position at the reference address in the L1 layer, may take a value of "90 µm" in the positive direction or in the negative direction, on the basis of the two types of relative shifts caused on the two-layer type optical disc provided with the L0 layer and the L1 layer described above. Therefore, it can be said that there is a possibility that the deviation may vary in a range which holds a value of "180 µm" as a maximum value.

(1-3-3) Radius of Transmitted Light

As shown in FIG. 4, the "radius of transmitted light" of the present invention will be discussed.

As shown in FIG. 4, in the two-layer type optical disc, there is a possibility that the radius of transmitted light rb may be caused by the fact that the beam shape of the laser light is a cone. The "radius of transmitted light" herein is a radius of an area (irradiation area) in which the laser light is irradiated to penetrate the L0 layer but not to focus (i.e. defocus) on the L0 layer when the laser light is irradiated to focus on the L1 layer.

Specifically, the maximum value of the radius of transmitted light rb is expressed by the following equation (10).

$$rb = L \times \tan<\sin-1(NA/n)> \qquad (10)$$

wherein,

L: thickness of a middle layer (a layer inserted between the L0 layer and the L1 layer)

NA: numerical aperture in optical system n: refractive index

Incidentally, in the present invention, "sin−1" is a reverse function of "sin".

More specifically, as one specific example of the maximum value of the radius of transmitted light rb, a value of "34 µm" may be calculated on the basis of (i) the numerical aperture (NA) of the laser light, (ii) the refractive index of the middle area which exists between the L0 layer and the L1 layer, and (iii) the thickness of the middle area which determines the interlayer distance of the L0 layer and the L1 layer.

Then, the influence of the radius of transmitted light rb needs to be considered in performing the recording or reproduction. Specifically, in order to obtain better recording signal features (or reproduction features), the recording is to be performed away from the radius of transmitted light rb.

As a result, it is necessary to consider the relative deviation which holds a value of "90 μm", for example, and the radius of transmitted light rb which holds a value of "34 μm", for example, in the positive direction or the negative direction, in actual recording.

(1-4) Relationship Between Address and Radial Position Including Relative Shift

Next, a specific example in the case where three types of relative shifts, for example, are caused on the two-layer type optical disc provided with the L0 layer and the L1 layer, which are related to the first recording layer and the second recording layer of the present invention, respectively, will be discussed with reference to FIG. 5. FIG. 5 is a graph showing one specific example of the relationship between the address and the radial position in the case where the dimensional error or the bonding error (or radial run-out) is caused in the L0 layer and the L1 layer, which are related to the first recording layer and the second recording layer of the present invention. Incidentally, the horizontal axis in FIG. 5 indicates the position in the radial direction, and the vertical axis indicates the address.

(1-4-1) Relationship Between Address and Radial Position (Interpreted by Aiming at Address)

As shown in FIG. 5, it is found out that if the above-mentioned three types of relative shifts are caused, for example, the relationship between the address and the radial position in the L0 layer and the L1 layer is also shifted in the horizontal direction on the graph, by the value of the "relative deviation" which corresponds to the relative shift.

Specifically, one relative deviation is indicated by the deviation between (i) the radial position of the "A point" expressed by an address of "X0" in the L0 layer and (ii) the radial position "24 mm" of the "C point" expressed by an address of "Inv X0" in the L1 layer. On the other hand, another relative deviation is indicated by the deviation between (i) the radial position of the "B point" expressed by an address of "X" in the L0 layer and the (ii) radial position "58 mm" of the "D point" expressed by an address of "Inv X" in the L1 layer.

(2) Position Verifying Apparatus for Verifying Relative Shift

Next, with reference to FIG. 6 to FIG. 13, a detailed explanation will be given to the basic structure and the operation principle of the position verifying apparatus for verifying the relative shift on the optical disc provided with the L0 layer, which is related to the first recording layer of the present invention, and the L1 layer, which is related to the second recording layer of the present invention. Particularly, in the embodiment, the "position verifying apparatus" of the present invention is applied to an information recording/reproducing apparatus for the optical disc.

(2-1) Basic Structure

At first, with reference to FIG. 6, the basic structure of an information/reproducing apparatus 300 according to the embodiment of the position verifying apparatus of the present invention, and a host computer 400 will be discussed. FIG. 6 is a block diagram showing the basic structures of the information recording/reproducing apparatus according to the embodiment of the position verifying apparatus of the present invention, and the host computer. Incidentally, the information recording/reproducing apparatus 300 has a function of recording the record data onto the optical disc 100 and a function of reproducing the record data recorded on the optical disc 100.

With reference to FIG. 6, the inner structure of information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit) 305 for the drive.

The information recording/reproducing apparatus 300 is provided with: the optical disc 100; an optical pickup 301; a signal recording/reproducing device 302; an address detection device 303; an address operation device 304; the CPU (drive control device) 305; a spindle motor 306; a memory 307; a data input/output control device 308; a bus 309; and an oscilloscope 310.

The host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by containing the host computer 400 having a communication device, such as a modem, in the same housing. Alternatively, the CPU (host control device) 401 of the host computer 400 having a communication device, such as an i-link, may directly control the information recording/reproducing apparatus 300 through the data input/output control device 308 and the bus 309, to thereby communicate with the external network.

The optical pickup 301 is to perform the recording/reproduction with respect to the optical disc 100, and is provided with a semiconductor laser device, a lens, and the like. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 controls the optical pickup 301 and the spindle motor 306, to thereby perform the recording/reproduction with respect to the optical disc 100. More specifically, the signal recording/reproducing device 302 is provided with: a laser diode (LD) driver; a head amplifier; and the like, for example. The laser diode driver (LD driver) drives a not-illustrated semiconductor laser device located in the optical pickup 301. The head amplifier amplifies the output signal of the optical pickup 301, i.e. the reflective light of a light beam, and outputs the amplified signal. More specifically, the signal recording/reproducing device 302 drives the not-illustrated semiconductor laser device located in the optical pickup 301, in order to determine an optimum laser power by the recording and reproduction processes for an OPC (Optimum Power Control) pattern, together with a not-illustrated timing generator or the like, under the control of the CPU 305, upon an OPC process. In particular, the signal recording/reproducing device 302 constitutes one example of the "measuring device" in addition to the "first recording device" and the "second recording device" of the present invention, together with the optical pickup 301.

The address detection device 303 detects an address (address information) on the optical disc 100, from a reproduction signal, including a pre-format address signal or the like and outputted by the signal recording/reproducing device 302. Moreover, the address detection device 303 may be constructed to detect the offset information pre-recorded in the control data zone.

The address operation device 304 performs an operation or calculation, such as adding or subtracting the address offset value, with respect to the detected address.

With the oscilloscope 310, it is possible to observe a waveform, such as a RF reproduction waveform, from the reproduction signal outputted by the signal recording/reproducing device 302. In particular, the oscilloscope 310 constitutes another example of the "measuring device" of the present invention.

The CPU (drive control device) 305 controls the entire information recording/reproducing apparatus 300 by giving an instruction to various controlling devices, through the bus 309. In particular, the CPU 305 determines the location of various recording areas, on the basis of the address operated or calculated by the address operation device 304. Then, the CPU 305 controls the signal recording/reproducing device 302 to record various record information into the determined various recording areas. Moreover, software or firmware for operating the CPU 305 is stored in the memory 307. In particular, the CPU 305 is one example of the "judging device" and another example of the "measuring device" of the present invention.

The spindle motor 306 is intended to rotate and stop the optical disc 100, and operates upon accessing the optical disc. More specifically, the spindle motor 306 is constructed to rotate and stop the optical disc 100 at a predetermined speed, under spindle servo from a not-illustrated servo unit or the like.

The memory 307 is used in the whole data processing and the OPC process or the like on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like. In particular, the above-mentioned offset amount (shift amount), and the offset information about the address offset value or the like calculated on the basis of the offset amount (shift amount) may be stored (memorized) in the memory 307.

The data input/output control device 308 controls the input/output of the data from the exterior with respect to the information recording/reproducing apparatus 300, to thereby perform storage to and export from the data buffer on the memory 307. A drive control command issued from the external host computer 400 (hereinafter referred to as a "host", as occasion demands) connected to the information recording/reproducing apparatus 300 through an interface, such as a SCSI and an ATAPI, is transmitted to the CPU 305 through the data input/output control device 308. Moreover, the record/reproduction data is also transmitted and received with respect to the host computer 400 through the data input/output control device 308, in the same manner.

The CPU (host control device) 401, the memory 402, the data input/output control device 406, and the bus 407 in the host computer 400 are substantially the same the corresponding constitutional elements in the information recording/reproducing apparatus 300.

In particular, the operation control device 403 receives an operation instruction and performs display with respect to the host computer 400, and transmits an instruction by the operation button 404, such as an instruction to record or reproduce, to the CPU 401. The CPU 401 may transmit a control command to the information recording/reproducing apparatus 300, through the data input/output control device 406, on the basis of instruction information from the operation control device 403, to thereby control the entire information recording/reproducing apparatus 300. In the same manner, the CPU 401 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can be recognized, so that the CPU 401 can output the operational state of the information recording/reproducing apparatus 300 to the display panel 405, such as a fluorescent tube and an LCD, through the operation control device 403.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a "drive", as occasion demands), and the host computer 400 is a personal computer and a work station. The host computer, such as the personal computer, and the drive are connected through the data input/output control device 308 (406), such as the SCSI and the ATAPI, and application, such as writing software, installed in the host computer controls the disc drive.

(2-2) Operation Principle

Next, with reference to FIG. 8 to FIG. 13, in addition to FIG. 7, as occasion demands, the operation principle of the information recording/reproducing apparatus according to the embodiment of the position verifying apparatus of the present invention will be discussed. FIG. 7 is a flowchart showing a recording operation by the information recording/reproducing apparatus, according to the embodiment of the position verifying apparatus of the present invention. FIG. 8 is a schematic diagram schematically showing one specific example of an entire area 11 in the L1 layer, which is related to the "second area" of the present invention, a recording area 10 in the L0 layer, which is related to the "first area" of the present invention, and the data amounts of the entire area 11 and the recording area 10. FIG. 9 are a schematic diagram (FIG. 9(a)) schematically showing an estimated area 12 related to the "estimated area" of the present invention, the recording area 10 in the L0 layer related to the "first area" of the present invention, and transit of an asymmetry value as being one example which represents reproduction quality in the estimated area 12, a graph (FIG. 9(b)) showing transit to one state of the asymmetry value in the estimated area 12 in the L1 layer, and a graph (FIG. 9(c)) showing transit to another state of the asymmetry value in the estimated area 12 in the L1 layer. FIG. 10 is a schematic diagram schematically showing addresses of two points ("J point" and "K point") included in the estimated area 12 in the L1 layer related to the "estimated area" of the present invention. Incidentally, the horizontal axis in the upper part in FIG. 9(a) indicates the position in radial direction. And the horizontal axis in the lower part in FIG. 9(a) indicates the address in the L1 layer, and the vertical axis indicates the asymmetry in the L1 layer.

According to the embodiment of the position verifying apparatus in the present invention, if the reproduction quality, such as the asymmetry, at two predetermined points included in the "estimated area" of the present invention are substantially equal to the reproduction quality indicated by the information recorded by the laser light which has penetrated the recording area in the L0 layer in which the information is recorded, it is possible to judge that the relative shift in the L0 layer and the L1 layer is within the tolerance.

Hereinafter, an explanation will be given in accordance with a predetermined procedure.

As shown in FIG. 7, at first, under the control of the CPU 305, information is recorded into the recording area 10 in the L0 layer (step S101). Specifically, as shown in the left part of FIG. 8, the information with a data amount corresponding to "2700 ECC blocks" is recorded into the middle circumferential part in the L0 layer.

Then, under the control of the CPU 305, the L1 layer is irradiated with the laser light LB, which holds a constant power, through L0 layer, to thereby record the information into the entire area 11 in the L1 layer including at least a partial area 11a which physically faces the recording area 10 in the L0 layer (step S102). In other words, a part of the information (hereinafter referred to "information I1a", as occasion demands) is recorded into the partial area 11a, by the laser light LB which has penetrated the recording area 10 in the L0 layer. At the same time, another part of the information (hereinafter referred to "information I1", as occasion demands) is recorded into the remaining area other than the partial area 11a out of the entire area 11, by the laser light LB which does not penetrate the recording area 10 in the L0 layer. Specifically, as shown in the right part of FIG. 8, the information with a data amount corresponding to "7060 ECC blocks (=2180×2+2700)" is recorded into the middle circumferential part in the L1 layer, for example. Incidentally, in the embodiment, an explanation is given to a method of recording with the power of the laser light held at an optimum constant value if the L0 layer is in the recorded state when the recording is performed in the entire area 11. However, it is obvious that the present invention can be applied even in a method of recording with the power of the laser light held at an optimum constant value if the L0 layer is in the unrecorded state.

Then, under the control of the CPU 305, the information recorded at least at two points ("J point" and "K point") included in the estimated area 12 in the present invention is reproduced, and the reproduction quality, such as the asymmetry, for example, is measured (step S103). The "estimated area" of the present invention herein is an area in which it is estimated that it is possible to obtain the reproduction quality which is substantially equal to the reproduction quality indicated by the information recorded by the laser light LB which has penetrated the recording area 10 in the L0 layer if the relative shift in the L0 layer and the L1 layer is within the tolerance. Incidentally, the estimated area 12 can be specified on the basis of the address of the recording area 10 and the relative shift in the tolerance. Thus, the two points ("J point" and "K point") included in the estimated area 12 can be also specified on the basis of the address of the recording area 10 and the relative shift in the tolerance.

Specifically, as shown in FIG. 9 and FIG. 10, an address "M(z)" which indicates the "J point" included in the estimated area 12 can be specified, by using (i) an address "z" which indicates a start edge "E point" of the recording area 10 in the L0 layer and (ii) an offset amount "b" which corresponds to the relative shift in the tolerance, as parameters. In the same manner, an address "M(y)" which indicates the "K point" included in the estimated area 12 can be specified, by using (iii) an address "y" which indicates an end edge "F point" of the recording area 10 in the L0 layer and (ii) the offset amount "b" which corresponds to the relative shift in the tolerance, as parameters. Incidentally, the quantitative explanation of the address "M(z)" and the address "M(y)" which indicate the "J point" and the "K point", respectively, included in the estimated area 12 will be discussed later. Incidentally, the information I1a recorded in the partial area 11a, and the information I1 recorded in the entire area 11 other than the partial area 11a may be reproduced, and the transit of the reproduction quality, such as the asymmetry, for example, may be measured.

Next, with reference to FIG. 9 described above in addition to FIG. 11, the transit of the reproduction quality will be discussed, qualitatively. FIG. 11 is a schematic diagram schematically showing (i) a situation in which the asymmetry value, as being one example which represents the reproduction quality near the outer circumferential edge of the estimated area 12 in the L1 layer related to the "estimated area" of the present invention, gradually transits from an appropriate level to an inappropriate level, and (ii) a position relationship between (ii-1) laser light and (ii-2) both the recording area 10 in the L0 layer related to the "first area" of the present invention and the estimated area 12, the position relationship being associated with the transit of the asymmetry value, for example, which is one index (one example) of the reproduction quality.

In addition to FIG. 11, as shown in FIG. 9(c) and FIG. 9(a), the asymmetry value near the outer circumferential edge of the estimated area 12 in the L1 layer is gradually transited from an appropriate level to an inappropriate level, due to the above-mentioned radius of transmitted light, which is caused by the fact the shape of the laser light LB irradiated in the L1 layer is cone. More specifically, as shown in the upper left part of FIG. 11, near the inner circumferential side of the outer circumferential edge of the estimated area 12, the information is recorded by the laser light LB which has penetrated the recording area 10 in the L0 layer, so that the asymmetry value is at the appropriate level. On the other hand, in the upper central part of FIG. 11, in a transit area 11b, which is an area on the outer circumferential side of the outer circumferential edge of the estimated area 12 and which is an area on the inner circumferential side of the outer circumferential edge of the partial area 11a which physically faces the recording area 10 in the L0 layer, the information is recorded under the situation that a ratio of the laser light LB which has penetrated the recording area 10 in the L0 layer and a ratio of the laser light LB which does not penetrate the recording area 10 in the L0 layer are transitional, so that the asymmetry value gradually transits from the appropriate level to the inappropriate level. On the other hand, in the upper right part of FIG. 11, in the entire area 11 which is an area on the outer circumferential side of the outer circumferential edge of the partial area 11a, the information is recorded by the laser light LB which does not penetrate the recording area 10 in the L0 layer, so that the asymmetry value is at the inappropriate level. Therefore, the "K point" included in the estimated area 12 is preferably located on the inner circumferential side, for example, by the offset amount "b" which includes the relative deviation and the radius of transmitted light.

In the same manner, as shown in FIG. 9(b) and FIG. 9(a), the reproduction quality near the inner circumferential edge of the estimated area 12 in the L1 layer is gradually transited from the inappropriate level to the appropriate level, due to the radius of transmitted light of the laser light LB irradiated in the L1 layer. Therefore, the "J point" included in the estimated area 12 is preferably located on the outer circumferential side, for example, by the offset amount "b".

Back in FIG. 7.

Then, under the control of the CPU 305, it is judged whether or not the asymmetry value, which is one index of the reproduction quality, measured at the "J point" and the "K point" included in the estimated area 12 is substantially equal to the asymmetry value of the information I1a recorded by the laser light which has penetrated the recording area 10 (step S104). If the asymmetry value measured at the "J point" and the "K point" is substantially equal to the asymmetry value at the appropriate level (the step S104: Yes), it is possible to judge that the relative shift in the L0 layer and the L1 layer is within the defined tolerance (step S105).

On the other hand, if the asymmetry value measured at the "J point" and the "K point" is not equal to the asymmetry value at the appropriate level (the step S104: No), it is possible to judge that the relative shift in the L0 layer and the L1 layer is out of the defined tolerance, so that it is possible to identify the optical disc provided with the L0 layer and the L1 layer to be an optical disc which does not comply with the standard (step S106).

(2-3) Quantification of Addresses which Indicate "K Point" and "J Point" Included in Estimated Area Next, the addresses "M(y)" and "M(z)" which indicate the "K point" and the "J point", respectively, included in the estimated area 12 described above will be discussed, quantitatively, with reference to FIG. 12 and FIG. 13. FIG. 12 are a graph (FIG. 12($a$)) schematically showing the relationship between the address and the radial position in both the estimated area 12 in the L1 layer related to the "estimated area" of the present invention and the recording area 10 in the L0 layer related to the "first area" of the present invention, and a schematic diagram (FIG. 12($b$)) schematically showing the transit of the asymmetry value as being one example of the reproduction quality in the estimated area 12. FIG. 13 are one and another conceptual views (FIG. 13($a$) and FIG. 13($b$)) showing a procedure in which the radial position is calculated from one address in the present invention. Incidentally, the horizontal axis in FIG. 12($a$) indicates the position in the radial direction, and the vertical axis indicates the address. The horizontal axis in FIG. 12($b$) indicates the address in the L1 layer, and the vertical axis indicates the asymmetry in the L1 layer.

(2-3-1) Quantification of Address which Indicates "K Point"

As shown in FIG. 12($a$), the address "M(y)" which indicates the "K point" included in the estimated area 12 can be expressed by (iii) the address "y" which indicates the end edge "F point" of the recording area 10 in the L0 layer and (ii) the following equations (1) and (2) with the offset amount "b" which is within the tolerance as a parameter. Incidentally, in the present invention, "Rt(x)" is a function which represents a square root. "Sqr(x)" is a function which represents square. "Inv(x)" is a function which indicates a complement number.

$$M(y)=\text{Inv}Y+Ax-<b\times(2\times R(y)-b)\times\pi<\div c \qquad (1)$$

wherein, b=(dimensional error tol)+(radial run-out ro)+(radius of transmitted light rb)=
124 (μm)

c="predetermined coefficient which indicates a recording area size per 1 ECC block"
(unit: mm²/ECC block)

Ax="reference shift amount"

The predetermined coefficient "c" which indicates a recording area size per 1 ECC block is a coefficient which represents the inverse number of the data amount recorded per unit area of the information recording medium. For example, it may be as follows.

$$c=(32\times1024\times8\times3.84\times0.74)/<(2048/2418)\times(8/16)\times 26.16\times1000000>$$

The number of ECC blocks which indicates the value of the above-mentioned "Ax" is a value which can be determined one-to-one, experimentally, experientially, theoretically, or by simulation, or the like, on the basis of a reference shift amount "a" shown next, for example.

Specifically, the reference shift amount "a" is the number of ECC blocks which represents a shift amount as being a reference set in the disc designing of the radial position of the "A point" (refer to FIG. 2) and the radial position of the "C point" (refer to FIG. 2). More specifically, the "A point" is the start position of the data area in the L0 layer, for example, and the address is "FFCFFFh" and the radial position is 24 mm (incidentally, diameter D0=48 mm). The "C point" is the end position of the data area in the L1 layer which is associated with (i.e. in a complement number relationship with) the "A point", and is located at the radial position with the address of "003000h".

Incidentally, "R(y)" in the equation (1) is expressed by the following equation (2).

$$R(y)=Rt[<\text{Sqr}(D0/2)\times\pi+(x0-y)c>/\pi] \qquad (2)$$

Incidentally, the details of the equation (2) will be discussed later.

(2-3-2) Quantification of Address which Indicates "J Point"

In the same manner, the address "M(z)" which indicates the "J point" included in the estimated area 12 can be expressed by (i) the address "z" which indicates the start edge "E point" of the recording area 10 in the L0 layer and (ii) the following equations (1a) and (2a) with the offset amount "b" corresponding to the relative shift as a parameter.

$$M(z)=\text{Inv}Z+Ax-<b\times(2\times R(z)-b)\times\pi<\div c \qquad (1a)$$

Incidentally, "R(z)" in the equation (1a) can be expressed by the following equation (2a).

$$R(z)=Rt[<\text{Sqr}(D0/2)\times+(x0-z)c>/\pi] \qquad (2a)$$

Incidentally, the details of the equation (2a) will be discussed later.

(2-3-3) Quantification of Address and Radial Position

Moreover, the above-mentioned equations (2) and (2a) can be derived in the following manner.

As shown in FIG. 13($a$), an area size "Sr" of a circle having the radial position "R(y)" of the "F point" with the address of "y" is equal to the sum of (i) an area size "S0" of a circle having a radial position "D0/2" of the above-mentioned "A point" with an address of "x0", for example, and (ii) a difference data amount "A S" which is from the address "x0" to the address Moreover, the area size "Sr" is obtained by π (pai) times "R(x)" squared. The area size "S0" is obtained by π (pai) times "D0/2" squared. The difference data amount "A S" is obtained by a difference between the addresses "x0" and "y", times the predetermined coefficient "c" squared. Thus, the following equation (3) is obtained. The above-mentioned equation (2) can be derived from the equation (3).

$$\text{Sqr}(R(y))\times\pi=\text{Sqr}(D0/2)\times\pi+(x0-y)\times c \qquad (3)$$

In the same manner, as shown in FIG. 13($b$), an area size "Sr" of a circle having the radial position "R(z)" of the "E point" with the address of "z" is equal to the sum of (i) an area "S0" of a circle having a radial position "D0/2" of the above-mentioned "A point" with an address of "x0", for example, and (ii) a difference data amount "ΔS" which is from the address "x0" to the address "z". Thus, the following equation (3a) is obtained. The above-mentioned equation (2a) can be derived from the equation (3a).

$$\text{Sqr}<R(z)>\times\pi=\text{Sqr}(D0/2)\times\pi+(x0-z)\times c \qquad (3a)$$

Particularly in the embodiment, in calculating the difference data amount "ΔS", the data amount is theoretically determined from the address on the basis of the premise that record line densities, which indicate the data amount per unit length, are equal in a first track and a second track.

Moreover, in calculating the difference data amount "ΔS", it may be also assumed that there is little or no influence of standard errors both at the start position "A point" of the data area in the L0 layer and at the end position "C point" of the data area in the L1 layer described above. In addition, in calculating the difference data amount "ΔS", so-called spiral integration calculation may be used.

A relationship between (i) the reproduction quality in the L1 layer and (ii) the addresses "M(y)" and "M(z)" which indicate the "K point" and the "J point", respectively, included in the estimated area 12, as described above, is shown in FIG. 12(b).

(3) Study of Operation and Effect of Position Verifying Apparatus of Present Invention Next, with reference to FIG. 14, the operation and effect of the position verifying apparatus of the present invention will be studied. FIG. 14 are a graph (FIG. 14(a)) schematically showing the relationship between the address and the radial position in both the estimated area 12 in the L1 layer and the recording area 10 in the L0 layer, in an optical disc in a comparison example, and a schematic diagram (FIG. 14(b)) schematically showing the transit of the reproduction quality in the estimated area 12 in the comparison example. Incidentally, the horizontal axis in FIG. 14(a) indicates the position in the radial direction, and the vertical axis indicates the address. The horizontal axis in FIG. 14(b) indicates the address in the L1 layer, and the vertical axis indicates the asymmetry in the L1 layer.

As shown in FIG. 14(a) and FIG. 14(b), in the optical disc in the comparison example, if the offset amount "b" is greater than 124 (μm) described above, for example, the asymmetry value at the "J point" which can be specified the address "M(z)" included in the estimated area 12 is smaller than the asymmetry value indicated by the information recorded by the laser light which has penetrated the recording area 10 in the L0 layer in which the information is recorded.

As a result, there arises a contradiction that the desired reproduction quality cannot be obtained in the estimated area 12 in which it is estimated that it is possible to obtain the reproduction quality which is substantially equal to the reproduction quality indicated by the information recorded by the laser light LB which has penetrated the recording area 10 in the L0 layer if the relative shift in the L0 layer and the L1 layer is within the tolerance. Therefore, the position verifying apparatus and method of the present invention can easily judge whether or not the relative shift is within the tolerance, on the basis of the reproduction quality in the estimated area.

(4) Second Embodiment of Position Verifying Apparatus

Next, with reference to FIG. 15 to FIG. 17, the second embodiment of the position verifying apparatus of the present invention will be discussed. FIG. 15 are a schematic diagram (FIG. 15(a)) schematically showing the transit of the asymmetry value as being one example of the reproduction quality which is actually measured on an information recording medium including the eccentricity of the estimated area 12 in the case where a bonding error (or eccentricity) and the radius of transmitted light are included, in a second embodiment of the present invention, and a graph (FIG. 15(b)) showing the transit of the asymmetry value in the entire area 11 in the ideal case in which the dimensional error in the L0 layer and the L1 layer is a reference value within tolerance (dashed line), and the transit of the asymmetry value actually in the L1 layer which is actually measured on the information recording medium including the dimensional error (thick line). FIG. 16 is a plan view schematically showing a position relationship between one track in the L0 layer and another track in the L1 layer which is associated with the one track, in the case where the dimensional error, the bonding error (or radial run-out), and the radius of the transmitted light are caused in the L0 layer and the L1 layer which are related to the first recording layer and the second recording layer, respectively, in the second embodiment of the present invention. FIG. 17 is a schematic diagram showing the transit of the asymmetry value as being one example of the reproduction quality in the case where relative deviation in the second embodiment of the present invention is maximum, and the transit of the reproduction quality in the case where the relative deviation is minimum. Incidentally, the horizontal axes in FIG. 15(a) and FIG. 15(b) respectively indicate the address in the L1 layer.

As shown in FIG. 15(a), by comparing the transit (showing by a thin line) of the reproduction quality, represented by the asymmetry value, for example, at a position where the relative deviation has the maximum value while the information recording medium is rotated once, with the transit (showing by a thick line) of the reproduction quality at a position where the relative deviation has the minimum value, it is possible to measure (i) the spot diameter of the laser light in the L0 layer, i.e., a diameter defocused in the L0 layer and (ii) the relative deviation including the radial run-out, for example.

In addition, as shown in FIG. 15(b), by comparing the transit (showing by a dashed line) of the reproduction quality in the entire area 11 in the ideal case, with the transit (showing by a thick line) of the reproduction quality in the L1 layer actually measured, it is possible to measure the relative deviation including the dimensional error, for example.

In aiming at the actual information recording medium, the influences of the radial run-out and the dimensional error are combined and are observed. However, on the basis of the above manner, it is possible to separately extract the relative deviation including the radial run-out and the relative deviation including the dimensional error.

Specifically, as shown in FIG. 16, the maximum value of the relative deviation is indicated by the deviation of radial positions of both a "M1-b point" on one track in the L1 layer represented by a circumference Cr1 and a "M0-b point" on one track in the L0 layer represented by a circumference Cr0. On the other hand, the minimum value of the relative deviation is indicated by the deviation of radial positions of both a "M1-s point" on one track in the L1 layer represented by the circumference Cr1 and a "M0-s point" on one track in the L0 layer represented by the circumference Cr0.

More specifically, as shown in the central part of FIG. 17 and a graph in the lower part of FIG. 17, a curve which indicates the amplitude of a reproduction signal in the case where the laser light for recording is irradiated which has penetrated the L0 layer in which the recorded area and the unrecorded area are mixed, varies between values shown by "top" and "bottom", depending on the extent of the relative deviation, while the information recording medium is rotated once. Then, the reproduction qualities, such as the asymmetry values, for example, are correspondingly calculated from the values shown by "top" and "bottom".

In the above-mentioned embodiments, the information recording/reproducing apparatus for additional recording or writing once, such as a DVD-R recorder and a DVD+R recorder, is explained as one example of the position verifying apparatus or position measuring apparatus. The present invention, however, can be applied to an information recording/reproducing apparatus for rewriting, such as a multiple layer type optical disc, such as a DVD-R recorder and a DVD+R recorder. Moreover, it can be applied to an information recording/reproducing apparatus for large-capacity recording, which uses blue laser for recording/reproduction.

The present invention is not limited to the above-described embodiments, and various changes may be made, if desired, without departing from the essence or spirit of the invention which can be read from the claims and the entire specification. A position verifying apparatus and method, a position measuring apparatus and method, and a computer program, all of which involve such changes, are also intended to be within the technical scope of the present invention.

INDUSTRIAL APPLICABILITY

The position verifying apparatus and method, and the computer program for position verification according to the present invention can be applied to a position verifying apparatus and method for verifying a relative shift in a plurality of recording layers of a multilayer information recording medium, such as a dual-layer DVD and CD (Compact Disc). Moreover, they can be applied to a position verifying apparatus or the like which is mounted on various computer equipment for consumer use or for commercial use, or which can be connected to various computer equipment.

The invention claimed is:

1. A position verifying apparatus for verifying extent of a relative shift in a radial direction (i) between a first recording layer and a second recording layer or (ii) between a first track and a second track, in an information recording medium comprising at least: the first recording layer in which the first track to record therein information is formed, and the second recording layer in which the second track to record therein the information is formed, said position verifying apparatus comprising:
a first recording device for recording the information into a first area of the first recording layer;
a second recording device (iii) for recording a part of the information by laser light which has penetrated the first area and (iv) for recording another part of the information by laser light which does not penetrate the first area, into a second area of the second recording layer including at least a partial area which faces the first area;
a reproducing device for reproducing the part of the information and the another part of the information, recorded in the second area; and
a judging device for judging whether or not the relative shift is within tolerance, on the basis of a transit position at which reproduction quality transits from one to the other out of the reproduction quality indicated by the part of the information reproduced and the reproduction quality indicated by the another part of the information reproduced.

2. The position verifying apparatus according to claim 1, wherein
the first area can be specified by a first address range which indicates a range from a first start address to a first end address,
the second area includes an estimated area which can be specified by an estimated address range which indicates a range, theoretically associated with the first address range, and
said judging device judges whether or not the relative shift is within the tolerance, on the basis of both a position in the estimated area and the transit position.

3. The position verifying apparatus according to claim 2, wherein the transit position or the position in the estimated area is indicated by an address or a radial position, based on one of the first recording layer and the second recording layer.

4. The position verifying apparatus according to claim 2, wherein the estimated area can be further specified so as to include relative deviation which has at least one of (i) a dimensional error held by each of the first recording layer and the second recording layer, (ii) a radial runout caused on the basis of a bonding error in the first recording layer and the second recording layer, and (iii) a radius of transmitted light which indicate a radius of an area in which the laser light is irradiated to penetrate the first recording layer but not to focus on the first recording layer when the laser light is irradiated to focus on the second recording layer.

5. The position verifying apparatus according to claim 2, wherein the estimated area can be further specified by at least both a second start address associated with the first start address and a second end address associated with the first end address.

6. The position verifying apparatus according to claim 5, wherein the estimated area can be further specified by a margin start address obtained by adding or subtracting a margin address, which indicates an address corresponding to the relative deviation, at the second start address, and a margin end address obtained by subtracting or adding the margin address at the second end address.

7. The position verifying apparatus according to claim 1, wherein a predetermined length in the radial direction in the first recording layer and the second recording layer can be numerically designated on the basis of a record line density which indicates a data amount per unit length in the first track and the second track and which can be calculated at least in a desired range.

8. The position verifying apparatus according to claim 7, wherein the data amount associated with the predetermined length is indicated by an area size corresponding to the predetermined length divided by a predetermined coefficient.

9. The position verifying apparatus according to claim 7, wherein the data amount associated with the predetermined length is indicated by spiral integration calculation, performed from an address which indicates a start edge of the predetermined length to an address which indicates an end edge of the predetermined length.

10. The position verifying apparatus according to claim 1, wherein the reproduction quality is indicated by an asymmetry value.

11. The position verifying apparatus according to claim 1, wherein
said first recording device forms the first area at least at two points out of an inner circumferential part, a middle circumferential part, and an outer circumferential part, in the first recording area,
said second recording device forms the second area at least at the two points in the second recording area, and
said judging device judges whether or not the relative shift can be allowed at least at the two points.

12. A position verifying method in a position verifying apparatus for verifying extent of a relative shift in a radial direction (i) between a first recording layer and a second recording layer or (ii) between a first track and a second track, in an information recording medium comprising at least: the first recording layer in which the first track to record therein information is formed, and the second recording layer in which the second track to record therein the information is formed, said position verifying method comprising:

a first recording process of recording the information into a first area of the first recording layer;

a second recording process (iii) of recording a part of the information by laser light which has penetrated the first area and (iv) of recording another part of the information by laser light which does not penetrate the first area, into a second area of the second recording layer including at least a partial area which faces the first area;

a reproducing process of reproducing the part of the information and the another part of the information, recorded in the second area; and a judging process of judging whether or not the relative shift is within tolerance, on the basis of a transit position at which reproduction quality transits from one to the other out of the reproduction quality indicated by the part of the information reproduced and the reproduction quality indicated by the another part of the information reproduced.

13. A position measuring apparatus for measuring extent of a relative shift in a radial direction (i) between a first recording layer and a second recording layer or (ii) between a first track and a second track, in an information recording medium comprising at least: the first recording layer in which the first track to record therein information is formed, and the second recording layer in which the second track to record therein the information is formed, said position measuring apparatus comprising:

a first recording device for recording the information into a first area of the first recording layer;

a second recording device (iii) for recording a part of the information by laser light which has penetrated the first area and (iv) for recording another part of the information by laser light which does not penetrate the first area, into a second area of the second recording layer including at least a partial area which faces the first area;

a reproducing device for reproducing the part of the information and the another part of the information, recorded in the second area; and a measuring device for measuring (v) a dimensional error held by each of the first recording layer and the second recording layer or (vi) a radial runout caused on the basis of a bonding error in the first recording layer and the second recording layer, as the relative shift, on the basis of a transit position at which reproduction quality transits from one to the other out of the reproduction quality indicated by the part of the information reproduced and the reproduction quality indicated by the another part of the information reproduced.

14. A position measuring method in a position measuring apparatus for measuring extent of a relative shift in a radial direction (i) between a first recording layer and a second recording layer or (ii) between a first track and a second track, in an information recording medium comprising at least: the first recording layer in which the first track to record therein information is formed, and the second recording layer in which the second track to record therein the information is formed, said position measuring method comprising:

a first recording process of recording the information into a first area of the first recording layer;

a second recording process (iii) of recording a part of the information by laser light which has penetrated the first area and (iv) of recording another part of the information by laser light which does not penetrate the first area, into a second area of the second recording layer including at least a partial area which faces the first area;

a reproducing process of reproducing the part of the information and the another part of the information, recorded in the second area; and a measuring process of measuring (v) a dimensional error held by each of the first recording layer and the second recording layer or (vi) a radial runout caused on the basis of a bonding error in the first recording layer and the second recording layer, as the relative shift, on the basis of a transit position at which reproduction quality transits from one to the other out of the reproduction quality indicated by the part of the information reproduced and the reproduction quality indicated by the another part of the information reproduced.

15. A computer readable recording medium with a computer program recorded thereon for position verification and for tangibly embodying a program of instructions executable by a computer provided in a position verifying apparatus, to make the computer function as at least one of a first recording device, a second recording device, a reproducing device, and a judging device, said position verifying apparatus for verifying extent of a relative shift in a radial direction (i) between a first recording layer and a second recording layer or (ii) between a first track and a second track, in an information recording medium comprising at least: the first recording layer in which the first track to record therein information is formed, and the second recording layer in which the second track to record therein the information is formed, said position verifying apparatus comprising:

said first recording device for recording the information into a first area of the first recording layer;

said second recording device (iii) for recording a part of the information by laser light which has penetrated the first area and (iv) for recording another part of the information by laser light which does not penetrate the first area, into a second area of the second recording layer including at least a partial area which faces the first area;

said reproducing device for reproducing the part of the information and the another part of the information, recorded in the second area; and said judging device for judging whether or not the relative shift is within tolerance, on the basis of a transit position at which reproduction quality transits from one to the other out of the reproduction quality indicated by the part of the information reproduced and the reproduction quality indicated by the another part of the information reproduced.

16. A computer readable recording medium with a computer program recorded thereon for position verification and for tangibly embodying a program of instructions executable by a computer provided in a position measuring apparatus, to make the computer function as at least one of a first recording device, a second recording device, a reproducing device, and a measuring device, said position measuring apparatus for measuring extent of a relative shift in a radial direction (i) between a first recording layer and a second recording layer or (ii) between a first track and a second track, in an information recording medium comprising at least: the first recording layer in which the first track to record therein information is formed, and the second recording layer in which the second track to record therein the information is formed, said position measuring apparatus comprising:

said first recording device for recording the information into a first area of the first recording layer;

said second recording device (iii) for recording a part of the information by laser light which has penetrated the first area and (iv) for recording another part of the information by laser light which does not penetrate the first area, into a second area of the second recording layer including at least a partial area which faces the first area;

said reproducing device for reproducing the part of the information and the another part of the information, recorded in the second area; and said measuring device for measuring (v) a dimensional error held by each of the first recording layer and the second recording layer or (vi) a radial runout caused on the basis of a bonding error in the first recording layer and the second recording layer, as the relative shift, on the basis of a transit position at which reproduction quality transits from one to the other out of the reproduction quality indicated by the part of the information reproduced and the reproduction quality indicated by the another part of the information reproduced.

* * * * *